(12) United States Patent
Jesse et al.

(10) Patent No.: US 6,778,518 B2
(45) Date of Patent: Aug. 17, 2004

(54) DISTRIBUTED RADIO SYSTEM WITH MULTIPLE TRANSCEIVERS FOR SIMULCASTING AND SELECTIVE PROCESSING OF RECEIVED SIGNALS

(75) Inventors: Mary Jesse, Redmond, WA (US); Jari Heinonen, Seattle, WA (US); Elliott Hoole, Sammamish, WA (US); Brian Schladetzky, Bellevue, WA (US); Greg Veintimilla, Sammamish, WA (US)

(73) Assignee: RadioFrame Networks, Inc., Bellevue, WA (US)

( * ) Notice: Subject to any disclaimer, the term of this patent is extended or adjusted under 35 U.S.C. 154(b) by 34 days.

(21) Appl. No.: 10/197,320

(22) Filed: Jul. 16, 2002

(65) Prior Publication Data

US 2003/0161290 A1 Aug. 28, 2003

Related U.S. Application Data

(60) Provisional application No. 60/359,638, filed on Feb. 25, 2002.

(51) Int. Cl.[7] .............................................. H04Q 7/24

(52) U.S. Cl. ...................... 370/338; 370/312; 370/328; 370/349; 455/422; 455/503

(58) Field of Search .............................. 370/310.1, 312, 370/315, 324, 328, 338, 349, 350, 508; 455/422, 426, 456, 502, 503, 517, 518, 519

(56) References Cited

U.S. PATENT DOCUMENTS 4,063,220 A   12/1977   Metcalfe et al. ............ 340/147

(List continued on next page.)

OTHER PUBLICATIONS

Cristian, F., "A Probabilistic Approach to Distributed Clock Synchronization," *Proceedings 9th International Conference on Distributed Computing Systems*, IEEE, Newport Beach, California, Jun. 5–9, 1989, pp. 288–296.

Cristian, F., and C. Fetzer, "Probabilistic Internal Clock Synchronization," *Proceedings of the Thirteenth Symposium on Reliable Distributed Systems*, IEEE, Dana Point, California, Oct. 25–27, 1994 (Dec. 6, 1995, version).

(List continued on next page.)

*Primary Examiner*—Dang Ton
*Assistant Examiner*—Shick Hom
(74) *Attorney, Agent, or Firm*—Christensen O'Connor Johnson Kindness PLLC

(57) ABSTRACT

A distributed radio system with multiple transceivers for simulcasting and selective processing of received signals is provided. The distributed radio system includes a plurality of processing elements and radio frequency transmitter elements interconnected by an Ethernet network. The system designates a number of radio frequency transmitter elements to be elements of a radio frequency simulcast set. The system utilizes relatively few frequency channels, and transmits at very low power levels, and thus causes minimal interference with an existing macrocellular environment. When signals transmitted from a mobile unit are detected by multiple radio receivers, the system is able to select a desired radio receiver signal for processing. When selecting a received signal for processing, the system utilizes a distributed processing technique that performs the selection process throughout several levels. The distributed processing utilized by the selection process may be synchronized. A selection time window may be utilized for making the selection process for the upstream-received data traffic. The system utilizes a centralized data link layer. Transmissions are implemented by a two-level multicast technique. The data transmission traffic is bundled. Selective management of the Ethernet switches is performed by the system.

26 Claims, 15 Drawing Sheets

U.S. PATENT DOCUMENTS

| | | | | | |
|---|---|---|---|---|---|
| 5,054,113 | A | * | 10/1991 | Jasinski | 455/503 |
| 5,117,424 | A | * | 5/1992 | Cohen et al. | 370/508 |
| 5,771,460 | A | * | 6/1998 | Vaitovirta et al. | 455/517 |
| 5,812,930 | A | | 9/1998 | Zavrel | 455/5.1 |
| 5,862,171 | A | | 1/1999 | Mahany | 375/200 |
| 6,028,860 | A | | 2/2000 | Laubach et al. | 370/395 |
| 2003/0012158 | A1 | | 1/2003 | Jin et al. | 370/335 |
| 2003/0092448 | A1 | * | 5/2003 | Forstrom et al. | 455/456 |
| 2003/0123420 | A1 | * | 7/2003 | Sherlock | 370/338 |

OTHER PUBLICATIONS

Metcalfe, R.M., and D.R. Boggs, "Ethernet: Distributed Packet Switching for Local Computer Networks," *Communications of the ACM, vol. 19*, No. 7, pp. 395–404, Jul. 1976.

Mills, D.L., "Network Time Protocol (Version 3) Specification, Implementation and Analysis," *Network Working Group Report RFC–1305*, University of Delaware, Mar. 1992.

* cited by examiner

DISTRIBUTED RADIO SYSTEM WITH MULTIPLE TRANSCEIVERS FOR SIMULCASTING AND SELECTIVE PROCESSING OF RECEIVED SIGNALS

CROSS-REFERENCE TO RELATED APPLICATIONS

The benefit of the filing date of provisional Application Serial No. 60/359,638, filed on Feb. 25, 2002, is hereby claimed for this application under 35 U.S.C. §119(e).

FIELD OF THE INVENTION

This invention relates generally to distributed radio systems and, more particularly, to an indoor system with multiple transceivers for simulcasting and selective processing of received signals.

BACKGROUND OF THE INVENTION

Wireless (e.g., cellular) operators are faced with the continuing challenge of expanding the coverage areas of their systems, while at the same time adhering to cost, power, and frequency limitations. One area for expanding coverage is in indoor environments. However, it is also desired that such systems not interfere with the existing macrocellular environment, even if operating in the same frequency band for a given cellular standard.

The present invention is directed to providing a system and method that can be operated at low power levels and which cause minimal interference with the existing macrocellular environment. More specifically, the present invention is directed to a system and method in which multiple transceivers are utilized in an indoor system and which are able to each effectively transmit signals to a mobile unit at low power levels by utilizing a simulcasting technique.

SUMMARY OF THE INVENTION

A distributed radio system with multiple transceivers for communicating with mobile units via simulcasting and selective processing of received signals is disclosed. In accordance with one aspect of the invention, the system transmits at very low power levels. Due to the use of the low power levels, the system does not tend to interfere with the existing macrocellular environment.

In accordance with another aspect of the invention, the system utilizes relatively few frequency channels. The system is able to provide large geographical coverage with relatively few channels, while transmitting at low power levels, by simulcasting identical radio frequency signals from several different radio transmitters distributed within a building or similar area using the limited number of frequency channels. This allows the system to cover a relatively large indoor installation. Furthermore, as noted above, the system interferes very little with the existing macrocellular environment, even though the same frequency band for a given cellular standard is being used, given that the system is able to operate at very low power levels by utilizing the simulcast technique.

In accordance with another aspect of the invention, in one embodiment the distributed radio system includes a plurality of processing elements and radio frequency transmitter elements interconnected by an Ethernet network (e.g., the IEEE 802). The distributed radio system simulcasts a common modulating signal on a common radio frequency carrier, using at least two radio frequency transmitter elements. A set of radio frequency transmitter elements, which simulcast a common modulated radio frequency signal, are designated as a radio frequency simulcast set. In operation, the elements of a radio frequency simulcast set are configured to receive Ethernet sampled signal packets and transmit the information contained in the packets by modulating their radio frequency carrier.

In accordance with another aspect of the invention, in one embodiment the simulcast method designates a number of particular radio frequency transmitter elements to be elements of a radio frequency simulcast set. A first set of Ethernet packets is transmitted to be received by the elements of the radio frequency simulcast set. The first set of Ethernet packets is used to program the elements of the radio frequency simulcast set with a multicast address. The elements of the radio frequency simulcast set are thereafter responsive to Ethernet packets containing the multicast address as the designation media access control (MAC) address. A second set of Ethernet packets is transmitted to be received by the elements of the radio frequency simulcast set. The second set of Ethernet packets is used to program the elements of the radio frequency simulcast set to operate using a particular common radio frequency carrier. In addition, Ethernet sampled signal packets are periodically transmitted. The Ethernet sampled signal packets contain a designation address, which is equivalent to the programmed multicast address. The elements of the radio frequency simulcast set are configured to receive the Ethernet sampled signal packets. The elements of the radio frequency simulcast set modulate the common radio frequency carrier in accordance with sampled data included in the Ethernet sampled signal packets.

In accordance with another aspect of the invention, the processing elements of the system include at least one central processing unit and a plurality of airlink processing units. The central processing unit is responsible for interfacing the system to external environments, such as a macrocellular environment, or to a public switched telephone network, as well as for network management of the overall system. In one embodiment, the central processing unit may be a network chassis unit. The central processing unit is coupled to several airlink processing units through an Ethernet network. Each airlink processing unit is coupled to several radio transceivers, also through the Ethernet network. In one embodiment, the airlink processing units may be airlink chassis units.

In accordance with another aspect of the invention, the data link layer may be centralized. For the transmission of data to the mobile units, it is important that the data, which is simulcast by several transmitters, be identical. If each simulcast radio frequency transmitter element does not transmit identical signals, co-channel interference can result, thus degrading the signal received by the mobile unit. To ensure that the transmitted data is identical, the layer 2 (data link layer) is centralized at the central processing unit. Layer 2 Ethernet packets are sent by the central processing unit to several airlink processing units, which further process the layer 2 information into waveforms, which are finally transmitted by each simulcast radio transmitter.

In accordance with another aspect of the invention, transmissions may be implemented by a two-level multicast technique. In an embodiment that utilizes this technique, the transmit data is sent by the central processing unit to multiple airlink processing units in layer 2 format as multicast Ethernet packets. Then, the transmit data is sent by each airlink processing unit to associated multiple radio transceivers in layer 1 format (sample waveforms), also as multicast Ethernet packets.

In accordance with another aspect of the invention, when signals transmitted from a mobile unit are detected by multiple radio receivers, the system is able to select a desired radio receiver signal for processing. The multiple radio receivers simultaneously provide detected data into the system. The detected data includes identical information, but at different quality levels. The system is able to select a desired signal for processing.

In accordance with another aspect of the invention, when selecting a received signal for processing, a distributed processing technique is utilized that performs a process of gradual selection. A given mobile device may be located in relatively close proximity to several possible wireless receivers. It is desired to select and process only the signal that is provided by the receiver having the strongest signal from the mobile unit. A selection decision is made by a process that has visibility to all of the relevant receivers in the system.

In accordance with another aspect of the invention, in a preferred embodiment, the system is interconnected via Ethernet links having limited bandwidth. This configuration would generally make it impractical to forward data from every receiver in the selective decision process because such would tend to rapidly exceed the network capacity. The solution provided by the present invention is to utilize a distributed processing technique that results in gradual selection. More specifically, the selection process may be performed at several different levels, including at the central processing unit and at the airlink processing units. The final selection process is located in the central processing unit, which is at the top of the system hierarchy. However, each airlink processing unit will choose the received signal from only one of the radio transceivers and will forward only one signal to the central processing unit for a final decision. In this way, the simulcast receiver processing is distributed through the system and the selection of the best-received signal is gradually selected as received signals flow up the hierarchy.

In accordance with another aspect of the invention, the selection process may be more or less distributed, depending on the available data rates of the system. For example, a system utilizing the Global System for Mobile Communications (GSM) technology, which has a relatively high data rate, may allow the central processing unit to have sufficient time to receive signals from several radio processing transceivers in a given airlink processing unit as part of the selection process. An additional technique for screening signals may involve requiring a minimum signal strength, which is detected in the radio transceivers themselves, in order to be forwarded upstream to the corresponding airlink processing unit.

In accordance with another aspect of the invention, the distributed processing utilized by the selection process may be synchronized. In one embodiment, it is desirable that the signals received from each radio transceiver correspond to substantially the same moment in time in order to correctly evaluate the differences between the received signals. It is desirable that the central processing unit be synchronized with the airlink processing units and the radio transceivers so that the central processing unit knows when to expect the arrival of received signals from the airlink processing units and when a decision in the selection process should be made. It is preferable that the synchronization be performed at least at the end points of the system, i.e., the central processing unit and the radio transceivers. However, the system delay can be further minimized if the processes in the airlink processing units are also synchronized.

In accordance with another aspect of the invention, a selection time window may be set for making the selection process for the upstream-received data traffic. Thus, selection decision is made by the selection process in the central processing unit within a certain time window, regardless of whether all expected received signal data has arrived at the central processing unit. In general, as part of this method, the central processing unit has a time base that is synchronized with the airlink processing units and the radio transceivers.

In accordance with another aspect of the invention, the data traffic may be bundled. Inbound traffic received from the radio transceivers is bundled in order to not overwhelm the central processing unit, which services the task for transmitting Ethernet packets. For multiple radio frequency channels, multiple Ethernet packets, each containing a selected received signal, can be periodically sent from each airlink processing unit to the central processing unit. Rather than sending individual Ethernet packets for each radio frequency channel, the data is bundled into one or more Ethernet packets, thus reducing the overhead required to service the transmission of multiple Ethernet packets. Outbound traffic that is transmitted by the radio transceivers may also be bundled, such that information from multiple radio frequency channels is grouped into a single Ethernet packet.

In accordance with another aspect of the invention, the system may perform selective management of Ethernet switches. In certain areas of the system, the data transmission traffic may be very high, such as at the Ethernet link between the radio transceivers and the airlink processing units, since much of this traffic represents the raw samples of the waveforms. Many of these Ethernet packets are also multicast packets, which would ordinarily be flooded throughout the network. However, in some embodiments this may be undesirable because other network connections in the system, such as between the central processing unit and the airlink processing units, may be burdened or overwhelmed by the traffic. In large systems, it is desirable to configure the Ethernet switches to filter, or reject, the transmission of designated packets on designated ports.

It will be appreciated that the disclosed system and method are advantageous in that they can be used to provide large geographical coverage (e.g., in an indoor system) with relatively few frequency channels and with relatively low power transmission requirements, and that they thus minimize the interference with the existing macrocellular environment even while operating in the same frequency band for a given cellular standard.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
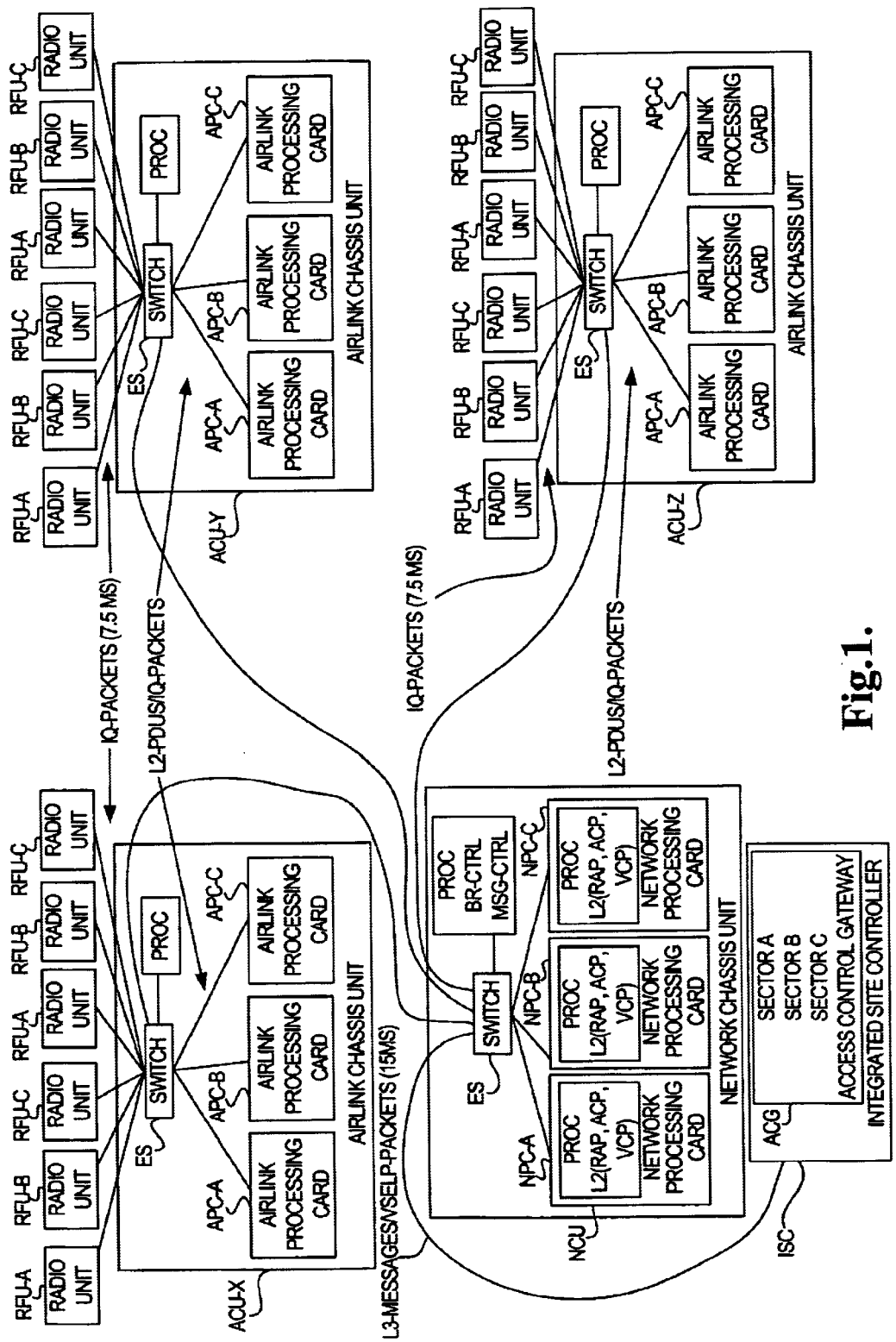
FIG. 1 is a block diagram of a system architecture.

FIG. 1 shows a system architecture. A network chassis unit NCU serves as a central processing unit and is coupled through Ethernet links to airlink chassis units ACU-X, ACU-Y, and ACU-Z. The network chassis unit NCU is responsible for interfacing the system to external environments, such as a macrocellular system or the PSTN, as well as network management of the overall system.

The network chassis unit NCU contains network processing cards NPC-A, NPC-B, and NPC-C. The network processing cards NPC-A, NPC-B, and NPC-C may actually be airlink processing cards, as will be described in more detail below. The network chassis unit NCU also includes an Ethernet switch ES which is coupled to a microprocessor PROC. In one embodiment, the Ethernet switch ES may be a broadcom Ethernet switch and the microprocessor PROC may be an 8240 microprocessor. The Ethernet switch ES is coupled through an Ethernet link to an integrated site controller ISC. While an integrated site controller is shown, it will be understood that other types of switching controllers may be substituted. In one embodiment, the communications between the Ethernet switch ES and the integrated site controller ISC are L3 messages/VSELP packets on 15 mSec timing. The integrated site controller ISC includes an access control gateway ACG, which includes processing for sectors A, B, and C, as will be described in more detail below.

Each of the airlink chassis units ACU-X, ACU-Y, and ACU-Z includes a set of airlink processing cards APC-A, APC-B, and APC-C. The airlink chassis units also each include an Ethernet switch ES, which is coupled to a microprocessor PROC and to each of the airlink processing cards APC, which each also include a microprocessor PROC. In one embodiment, in the configuration of FIG. 1 as well as in other configurations described below, the microprocessors PROC of the chassis units ACU or NCU may be 8240 microprocessors, while the microprocessors of the processing cards APC or NPC may be 8260 microprocessors.

The communications between the airlink processing cards APC and the Ethernet switch ES include L2 PDUs/IQ packets. The Ethernet switches ES are coupled through Ethernet links to the Ethernet switch ES of the network chassis unit NCU. The Ethernet switches ES of the airlink chassis units ACU are further coupled through Ethernet links to a series of radio units RFU-A, RFU-B, and RFU-C. The communications between the Ethernet switch ES and the radio units RFU are IQ packets (7.5 mSec). Each of the radio units RFU includes radio blades RB (not shown) for transmitting signals.

As will be described in more detail below, the basic requirement of the simulcast method of the present invention is that the same data is transmitted from every radio blade RB simultaneously for each of the sectors A, B, and C. To achieve this requirement, it is desirable to have all of the radio blades RB within the radio units RFU synchronized together and the protocol data unit PDU for a particular slot sent to all radio blades RB (in the same sector) within the same slot period.

To guarantee identical protocol data unit PDU data, the associated control procedure ACP, random-access procedure RAP, and voice channel procedure VCP tasks are placed in the network chassis unit NCU rather than the airlink chassis units ACU. This is illustrated in FIG. 1 for the network processing cards NPC-A to NPC-C and, thus, provides a common creation point for the protocol data unit PDU data that needs to be sent to all airlink processing cards APC. By using a multicast address on the outgoing protocol data unit PDU packets and guaranteeing slot synchronization between airlink processing cards APC, a simultaneous distribution of identical data can be made to take place.

The system and method of the present invention is also described in provisional U.S. Patent Application Serial No. 60/359,638, from which this application claims priority, and which is hereby incorporated herein by reference in its entirety. A related system is described in provisional U.S. Patent Application Serial No. 60/359,637, which is commonly assigned and which is hereby incorporated herein by reference in its entirety, and in an application Ser. No. 10/373,626, entitled "RADIO SYSTEM HAVING DISTRIBUTED REAL TIME PROCESSING", which is commonly assigned and co-filed with this application, and which is hereby incorporated herein by reference in its entirety.

Figure 2:
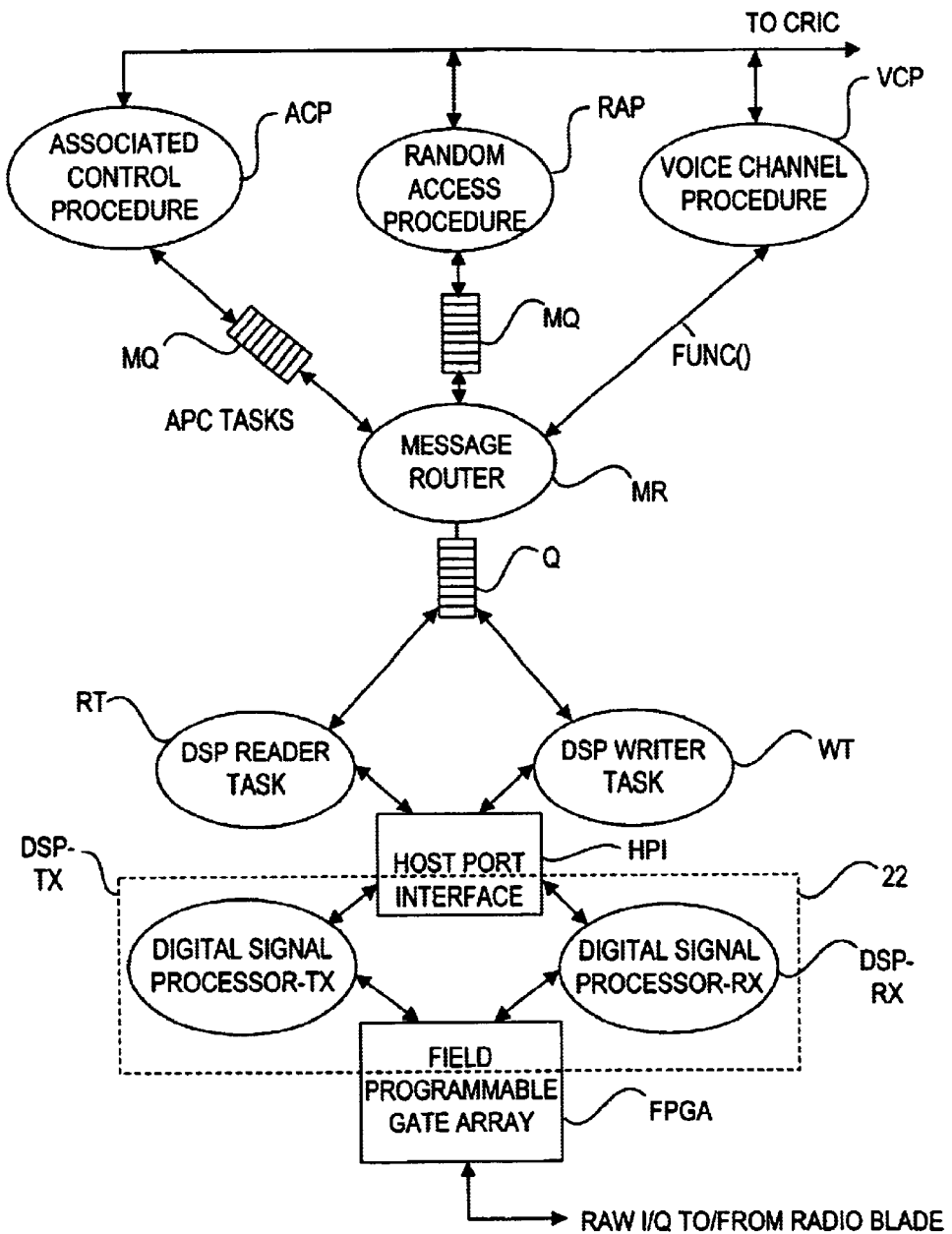
FIG. 2 is a diagram illustrating the flow of data through a non-simulcast system.

FIG. 2 is a diagram illustrating the flow of data through a non-simulcast system. This system is shown for purposes of illustration and to provide a better explanation of the simulcasting method of the present invention. The non-simulcast method illustrated by FIG. 2 is in an airlink processing card APC (as shown in FIG. 1) based embodiment. In general, the digital signal processors and the tasks that process the protocol data unit PDU data from the digital signal processors are tightly coupled via the host-port interface HPI. As shown in FIG. 2, the tasks that process the protocol data unit PDU data are the associated control procedure ACP, the random-access procedure RAP, and the voice channel procedure VCP. Data is transferred to the associated control procedure ACP and the random-access procedure RAP from a message router MR through message queues MQ. Data is transferred to the voice channel procedure VCP through a function FUNC. Data reaches the message router MR through a queue Q from a digital signal processor reader task RT, and a digital signal processor writer task WT. Data reaches the reader task RT and the writer task WT from the host-port interface HPI. Data reaches the host-port interface HPI from the digital signal processor and, more specifically, from the component DSP-Tx and the component DSP-Rx. Data reaches the component DSP-Tx and component DSP-Rx from the component FPGA, which provides and receives raw I/Q to the radio blade.

Referring to FIG. 2, the data transfer is started based on what is called a slot request. A slot request is a request by the digital signal processor for a new protocol data unit PDU to transmit in the next slot. In one embodiment, a slot request is received by the digital signal processor reader task RT every 15 mSec, from the DSP component 22. This slot request event is triggered by the arrival of an I/Q sample packet from the radio blade RB. The digital signal processor reader task RT then sends a message to the message router MR, which calls the appropriate function to get the protocol data unit PDU. The protocol data units PDU are retrieved via function calls and sent via the message queues. The message router MR then sends the protocol data unit PDU to the digital signal processor writer task WT, which then writes it to the digital signal processor. In one embodiment, the time between slot requests is 15 mSec and, as such, there is an approximately 14 mSec period to receive the slot request message and respond back to the digital signal processor with a protocol data unit PDU. The digital signal processor converts the protocol data unit PDU to an I/Q sample packet and then sends it to the radio blade RB for RF transmission.

In addition to the slot requests, there are also outbound protocol data units PDU from the digital signal processor to the integrated site controller ISC, Handover Messages, inbound integrated site controller ISC messages, periodic monitoring events, and UDP configuration messages that are generally desired to be processed within this 14 mSec period. Many of these additional events are asynchronous and, as such, they can occur at any time and in any grouping. In the system of FIG. 2, there is also generally an Ethernet switch (not shown) that provides proper routing of the Ethernet packets.

In one embodiment of the present invention, one of the design goals is to have a limit of three control channel frequencies per system, which may make C/I difficult to control via standard cellular reuse techniques. This becomes an issue any time a given radio blade RB is transmitting symbols that do not match those transmitted from other cells. This is a possibility if specific symbols for bearer traffic and control channel messages are not centrally coordinated throughout the service area of the system. These issues will be discussed below with reference to FIG. 3, which illustrates a pseudo-simulcast system, and with reference to FIGS. 5–9, which illustrate true simulcast systems in accordance with the present invention.

Figure 3:
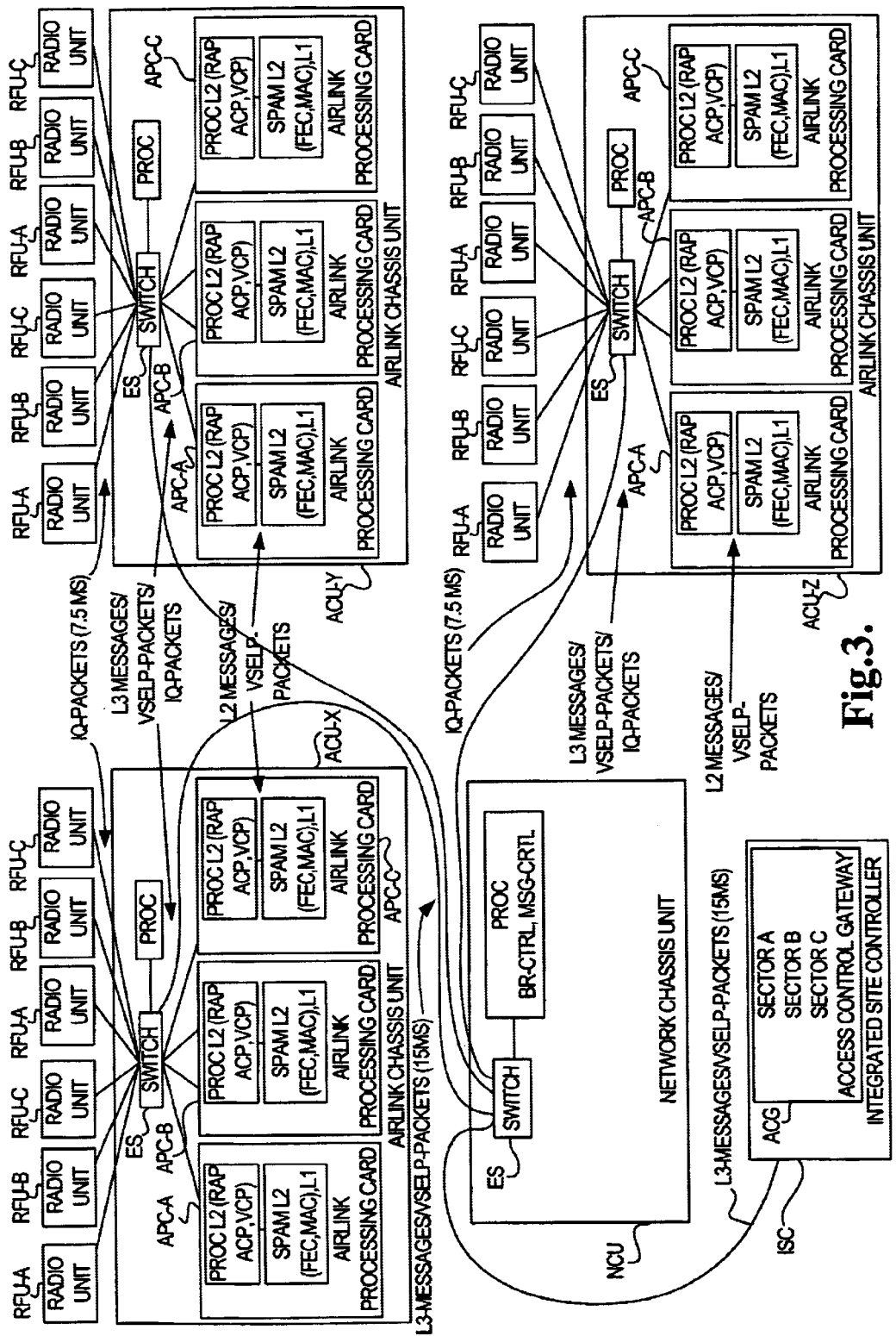
FIG. 3 is a block diagram of a pseudo-simulcast system.

FIG. 3 shows a pseudo-simulcast system in which layer 2 messages are generated in the airlink chassis units ACU as shown. FIG. 3 has similar components to those of FIG. 1. As illustrated in FIG. 3, for the airlink chassis units ACU, the transmissions from the airlink processing cards APC to the Ethernet switches ES include L3 messages/VSELP packets/IQ packets. The transmissions within the airlink processing cards APC include L2 messages/VSELP packets, which are sent from the microprocessor PROC L2 component, which controls the random-access procedure RAP, associated control procedure ACP, and the voice control procedure VCP, to the component for the SPAM L2 (FEC, MAC), L1. The transmissions from the Ethernet switch ES of the network chassis unit NCU and the Ethernet switches ES of the airlink chassis units ACU include L3-messages/VSELP-packets (15 ms), which are the same type of messages transmitted between the Ethernet switch ES of the network chassis unit NCU and the integrated site controller ISC.

The distributed layer 2 processing of FIG. 3 simplifies network design, but opens up the possibility of different packaging of layer 2 symbols into airlink frames. In this scenario, every radio unit RFU that transmits a symbol different from the radio unit RFU serving the mobile will effectively be creating random co-channel interference to that mobile. In true simulcast systems, the layer 2 messages are centrally located and distributed to each airlink chassis unit ACU (and then to each radio unit RFU) in a synchronous manner such that each airlink frame from each radio unit RFU contains exactly the same symbols. This could also be accomplished with distributed layer 2 symbol generation and packing but would require a substantial synchronization protocol to assure system-wide symbol-to-airlink packet synchronization.

Figure 4:
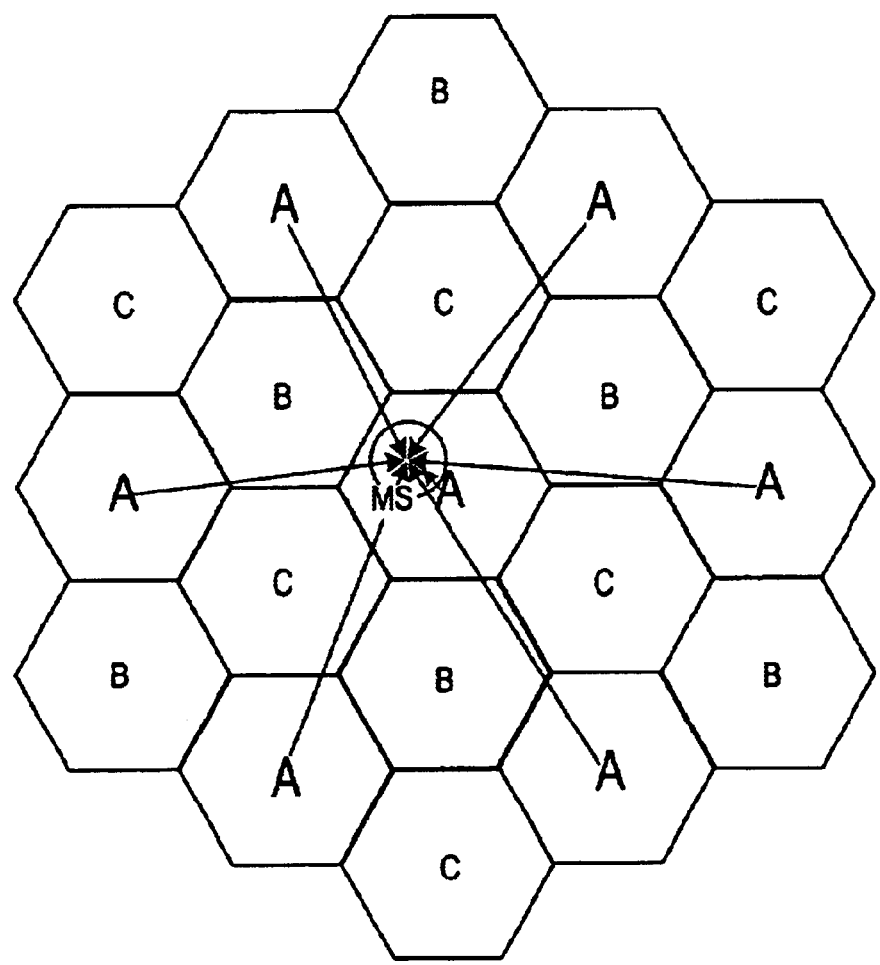
FIG. 4 is a diagram showing a reuse pattern for a one-cell, three-sector system.

FIG. 4 shows a 1-cell/3-sector reuse pattern. The pattern shows elements for sectors A, B and C. FIG. 4 illustrates an example of how signals transmitted from different radio units RFU in a Sector A sum up in the Mobile Station located in the middle of Sector A. According to one experimental set of results, a simple edge of the cell case (without the increased degradation of channel fading and without including through floor and ceiling effects) showed that pseudo-simulcast systems may, in some circumstances, only have 9.5 dB C/I relative to co-channel non-synchronous control channel symbols. This is generally below the operational threshold for Integrated Dispatch Enhanced Network (iDEN) waveforms and assumes a well-planned and regular network topology, which may be unavailable in certain embodiments. This data point encourages the use of true simulcast control channel (and bearer traffic) messaging over pseudo-simulcast messaging.

The problems associated with simulcast messaging include nulls created by vector signal cancellation and the need for system-wide synchronization of both symbols (discussed above) and RF frame timing. Simulcast signals will destructively interfere, which will create nulls within the system coverage area. The conditions for deep nulls or near-complete signal cancellation are quite specific, though. In the case of two simulcast signals transmitted with line-of-sight propagation models, the only place where signals will cancel is at the midpoint where each path loss is equal and then only when the RF envelope phases are diametrically opposed. As randomness in terms of channel variability and number of simulcast carriers is increased, it becomes more difficult to create a deep null cancellation. System simulations using simple distance-based path loss modeling and uniform random carrier phase distributions show less than 1% of the total coverage area at risk of deep coverage nulls with two simulcast pilots and less than 0.1% coverage null probability with three simulcast carriers. These simple estimates show that signal nulling is generally not a major concern from a coverage reliability standpoint. It is also important to note that in the 850 MHz band the signal wavelength is short enough that the specific phase cancellation that creates a deep null can be changed by moving the mobile receiver a mere 10 cm. Thus, it is unlikely that a mobile receiver will stay in a deep null for very long.

From the system-timing standpoint, simulcast forward link packets will appear as multipath elements to the mobile receiver. If the total time delay between the first and last received simulcast signal exceeds the delay spread tolerance of the system signal, degradation will occur. A simple estimate for system delay spread tolerance would be to limit all signals within 10 dB of the main signal path to 10% of the transmit symbol duration. For the iDEN waveform, this translates to capturing all signals within 10 dB of the main signal within 25 $\mu$Sec. Since true simulcast pilots will often be received as strong or possibly stronger than the signal of interest (an unlikely scenario for normal multipath systems), a conservative estimate would limit total excess time delay between first and last significant signal to 15 μSec. Allocating 5 μSec to time-of-flight variations still allows for 1 mile of excess time of flight between the serving radio unit and all other significant radio units. Even in a line-of-sight network, the radio units located a mile from the serving radio unit would not have enough energy to result in signal degradation. Thus, in this embodiment, 5 μSec appears to be a conservative excess time of flight allowance. This still leaves 10 μSec of "delay spread" budget for base-to-base frame timing variations.

Figure 5:
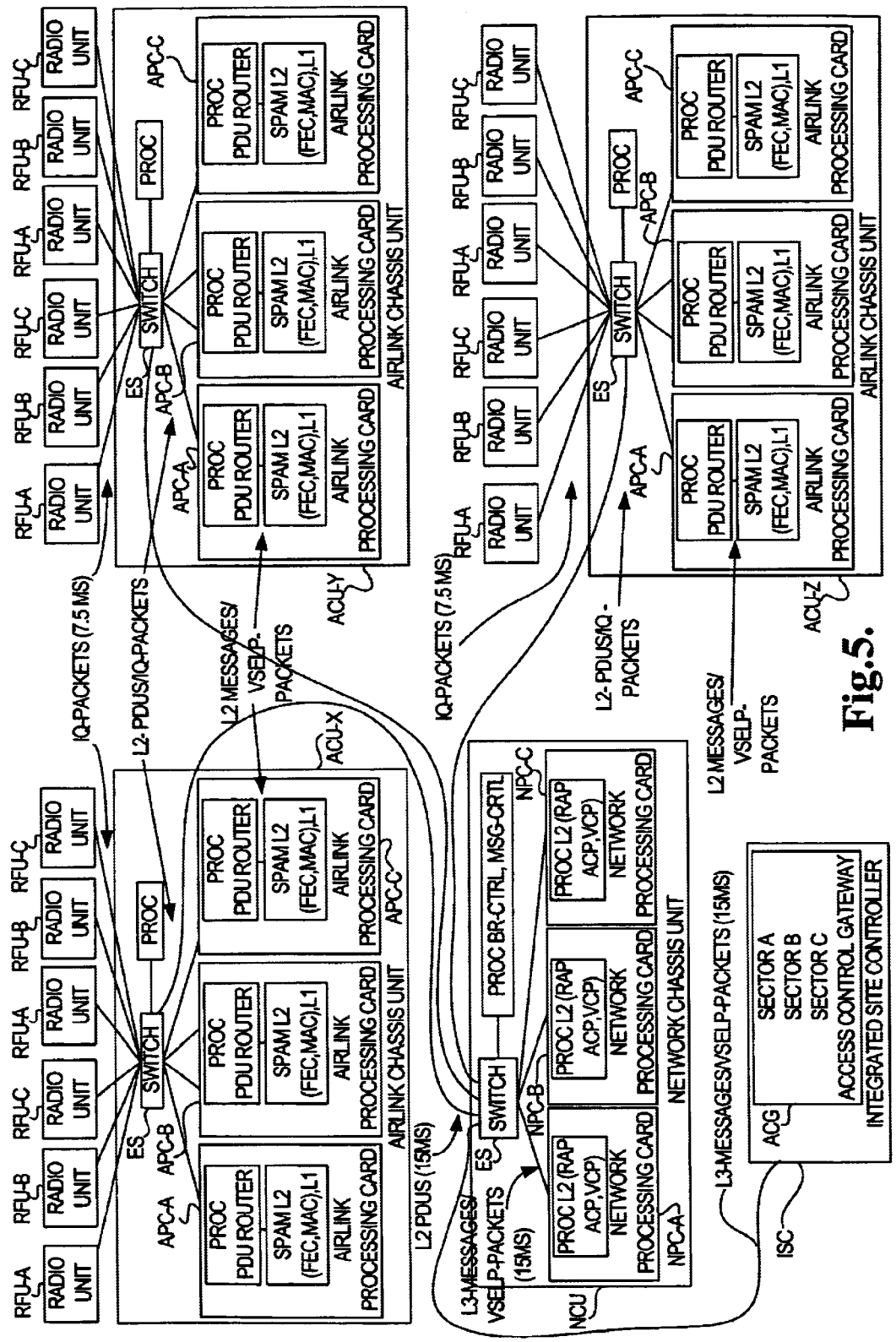
FIG. 5 is a block diagram of a simulcast system in which the layer 2 processing is performed on the network chassis unit and the layer 1 processing is performed on the airlink chassis unit.
Figure 6:
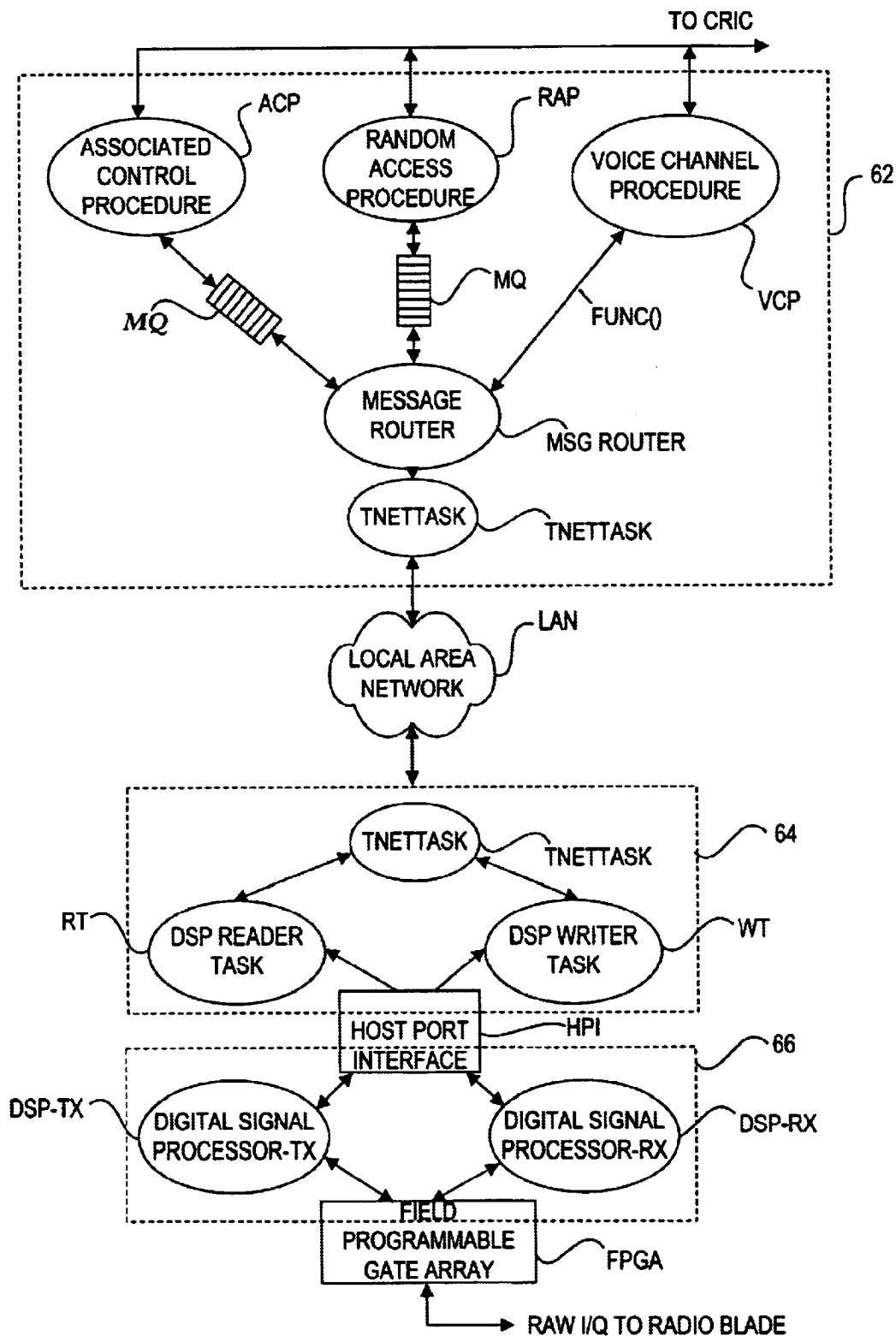
FIG. 6 is a diagram illustrating the flow of data through the system of FIG. 5.
Figure 7:
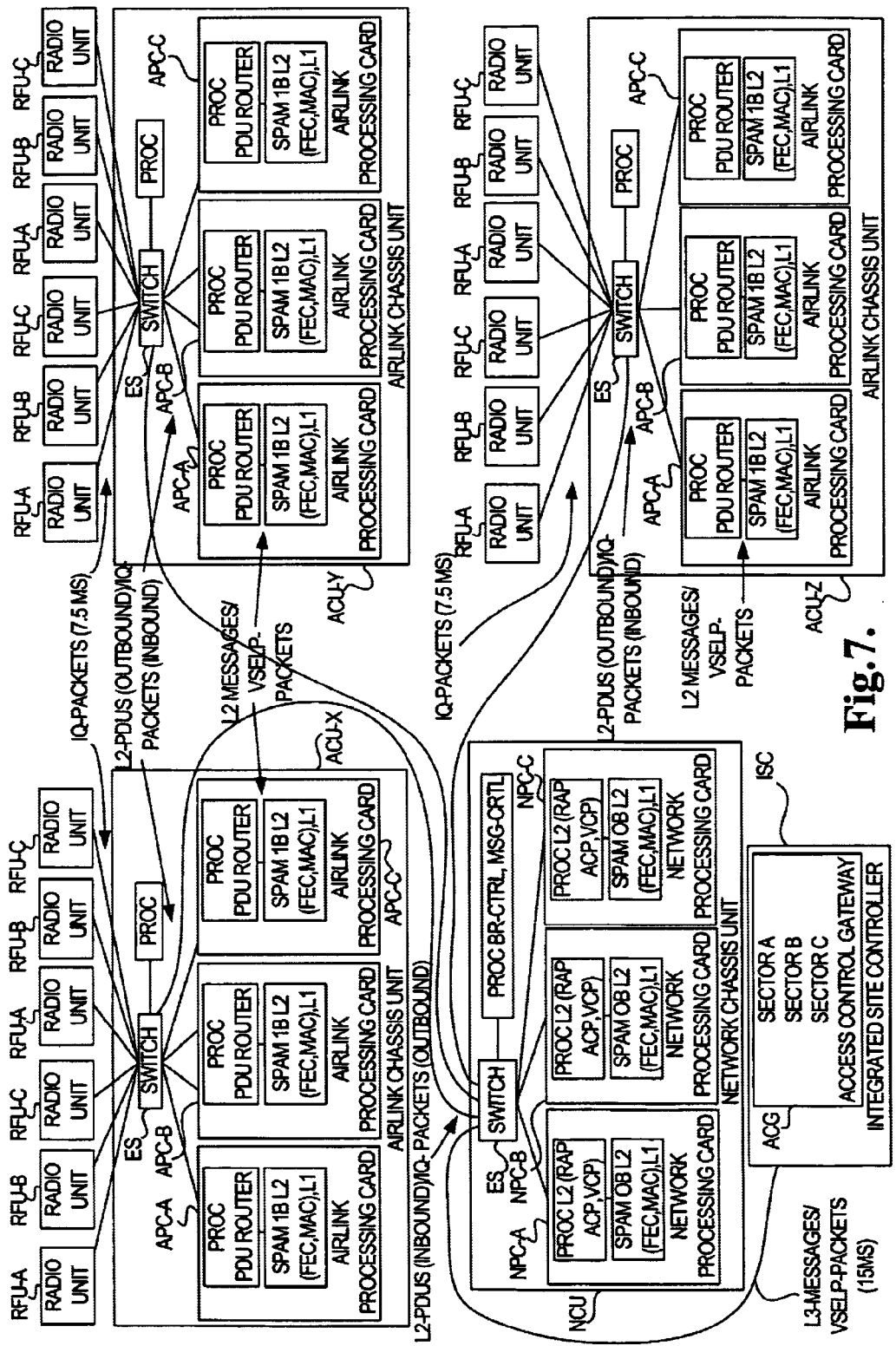
FIG. 7 is a block diagram of a simulcast system in which the layer 2 processing is performed on the network chassis unit and the layer 1 processing is split between the network chassis unit and the airlink chassis unit.
Figure 8:
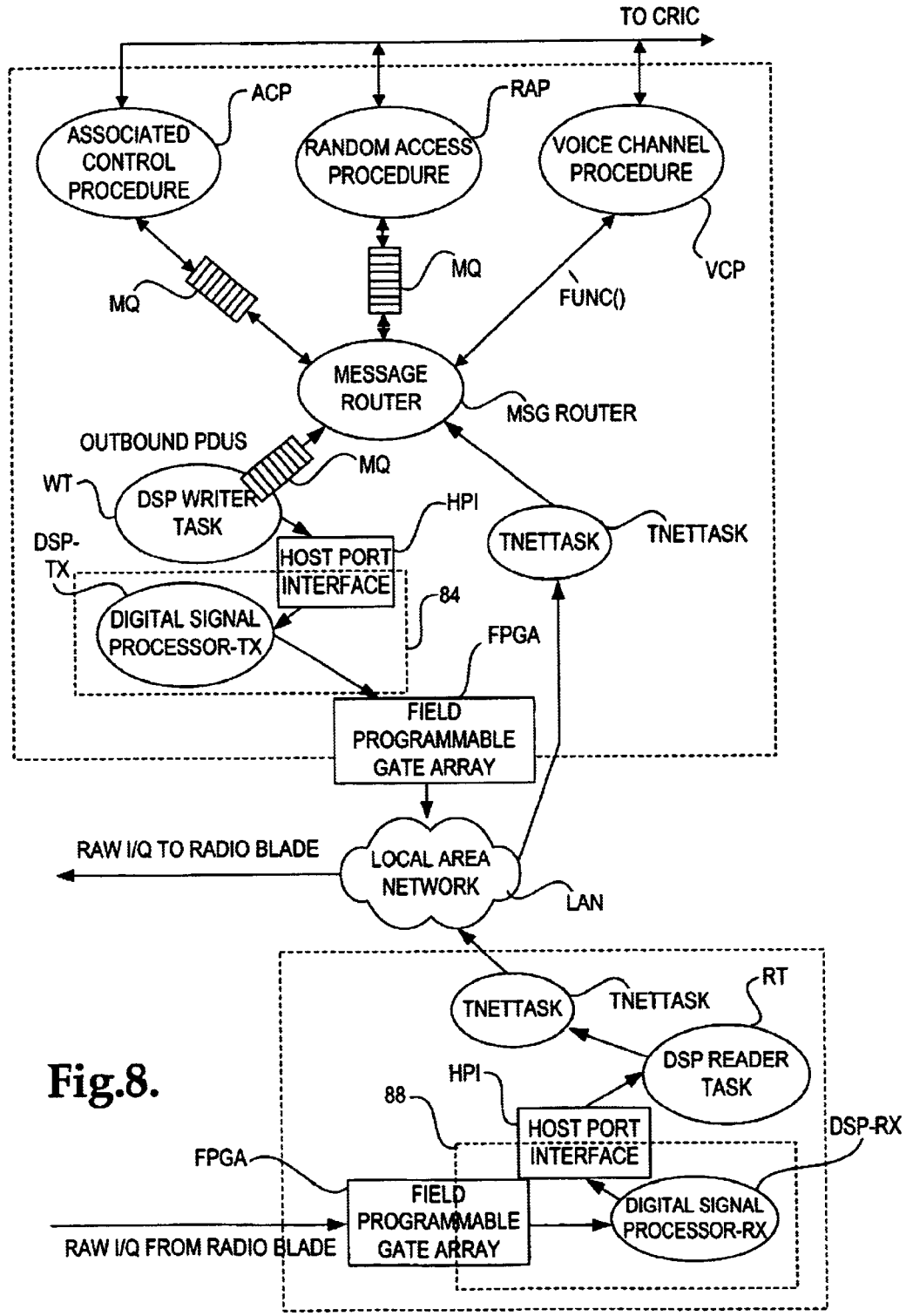
FIG. 8 is a diagram illustrating the flow of data through the system of FIG. 7.
Figure 9:
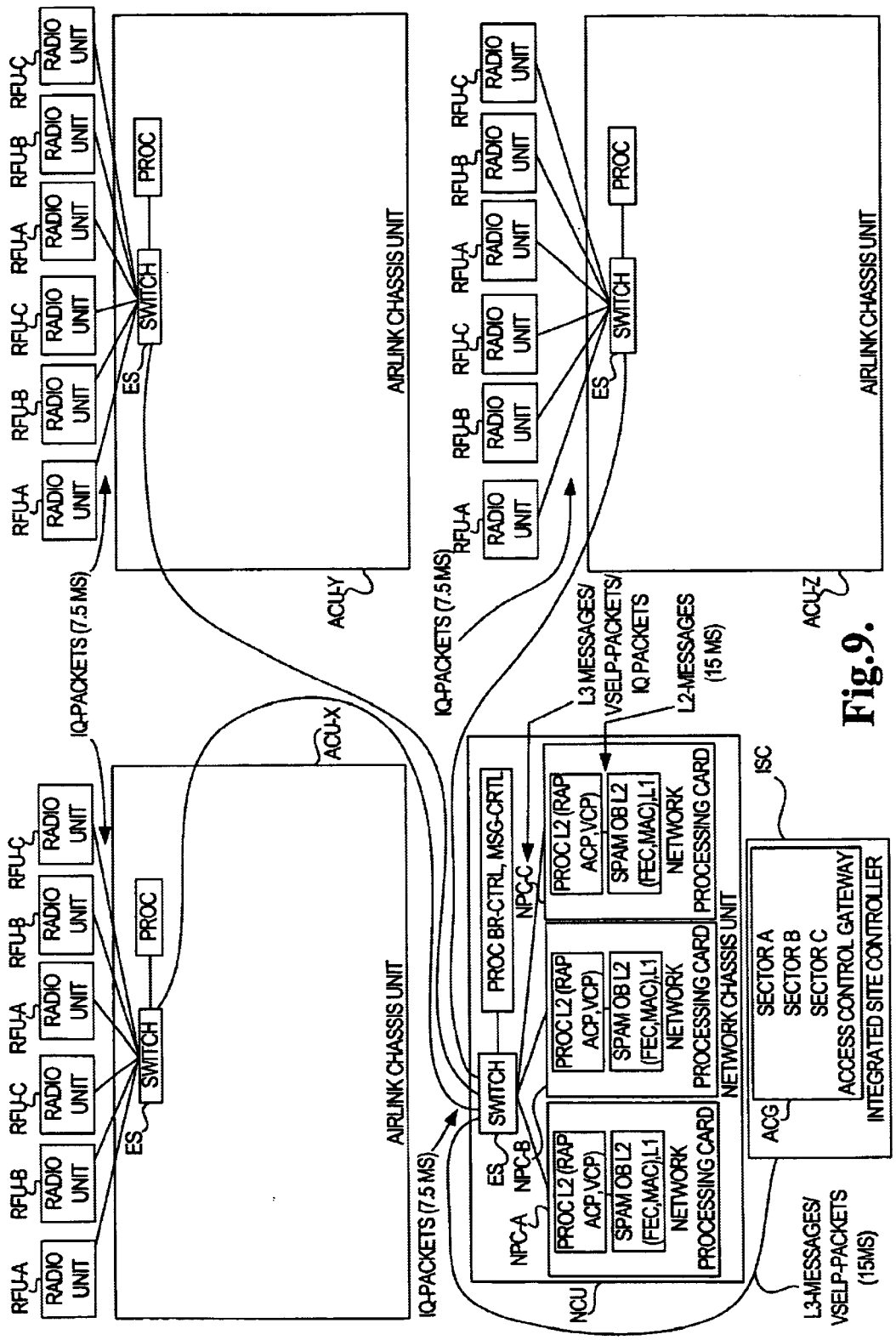
FIG. 9 is a block diagram of a simulcast system in which both the layer 2 and layer 1 processing are performed on the network chassis unit.

FIGS. 5–9 illustrate different embodiments of simulcast systems in accordance with the present invention. In the embodiment of FIGS. 5–6, the layer 2 processing (L2) is performed on the network chassis unit NCU and the layer 1 processing (L1) is performed on the airlink chassis unit ACU. In the embodiment of FIGS. 7–8, all the outbound processing and L2 are performed on the network chassis unit NCU and inbound L1 are performed on the airlink chassis unit ACU. In the embodiment of FIG. 9, all the processing is done on the network chassis unit NCU.

To implement the simulcast system of the present invention, the generation of protocol data units PDU can be done at a single central location and, by using a multicast address, can distribute the protocol data unit to all airlink processing cards APC simultaneously. One solution is to have the associated control procedure ACP, random-access procedure RAP, and voice channel procedure VCP tasks operating on an airlink processing card APC in the network chassis unit NCU, thus becoming a network processing card NPC. There will be one network processing card NPC for each sector. Although there is no separate task for a voice channel procedure VCP, the voice channel procedure VCP processing is done as part of the slot request, which still needs to be centralized.

In the embodiment of FIG. 5, all of the upper L2 processing (CPU, random-access procedure, associated control procedure, voice channel procedure) is located on the network chassis unit NCU in one or more network processing cards NPC. L1 and lower L2 (FEC, MAC) processing is located on the airlink chassis unit ACU in one or more airlink processing cards APC. Outbound protocol data units PDU are simulcast from network processing cards NPC to all the airlink chassis unit(s) ACU, where IQ-packets are generated and simulcast to all the radio units RFU connected to the airlink chassis unit(s) ACU. In the inbound direction, every airlink chassis unit ACU receives IQ-packets from radio unit(s) RFU and selects the best packet for processing. If a valid message is decoded, it is forwarded to network chassis unit NCU where the final selection between packets received from several airlink chassis units ACU is made.

One of the advantages of the embodiment of FIG. 5 is that, because of short and less frequent L2 protocol data units, there is little traffic between network chassis unit NCU and airlink chassis unit ACU. In addition, the centralized L2, which uses time stamps (slot numbers) in inbound and outbound messages, guarantees synchronization between airlink chassis units ACU. Furthermore, all the detected inbound L2 protocol data units are forwarded to the network processing card NPC, which means that no mobility management is needed to locate the Mobile Station in the system. Finally, with regard to converting a non-simulcast system, no changes are needed to the CPU and digital signal processor processing modules, and only minor changes are needed to the interfaces between digital signal processor and CPU. In addition, the reliability of the system may be further improved by improving the reliability of the link between network chassis unit NCU and the airlink chassis unit(s) ACU to guarantee that critical information maintained by the network chassis unit NCU (like channel setup tables) can be reliably transmitted to every airlink chassis unit ACU.

FIG. 6 is a diagram illustrating the functional tasks for the embodiment of FIG. 5, and is somewhat similar to FIG. 2. In this embodiment, the message queue MQ interface between the digital signal processor Reader/Writer task and the message router MR is replaced with the network interface, which includes the local area network LAN accessed from either side by the components TNETTASK. In one embodiment of this method, slot requests are generated by a 15 mSec clock interrupt on the network processing card NPC and sent to the message router MR directly. The generated protocol data unit PDU is then sent to all the airlink processing cards APC for a particular sector via the network, using a multicast address. Inbound protocol data units PDU are also received via the network.

The embodiment of FIGS. 5 and 6 localizes heavy IQ-packet traffic to the link between the airlink chassis unit ACU and the radio units RFU, and keeps L2 interfaces symmetrical and simple. Even if the CPU and digital signal processor(s) are separated to network chassis unit NCU and airlink chassis unit ACU, the messaging delays are generally acceptable. Collecting protocol data units PDU to/from several radio blades RB together and sending them all at once in one message can reduce the number of messages considerably. In one embodiment, there is a 15 mSec time slot allocated for the messaging delays between CPU and digital signal processor, which is generally sufficient. The reliability of the system is improved by improving the reliability of the link between network chassis unit NCU and airlink chassis units ACU. The architecture has less traffic than certain other embodiments, which makes it possible to develop reliable protocols between the network chassis unit NCU and airlink chassis unit ACU.

In the embodiment of FIG. 7, all of the outbound L2 and L1 processing is located on the network chassis unit NCU in one or more network processing cards NPC. Outbound IQ-packets are simulcast from network processing cards NPC to all the radio units RFU. Inbound upper L2 (CPU) is located on the network chassis unit NCU in one or more network processing cards NPC. Lower L2 and L1 processing (digital signal processor) is located on the airlink chassis unit ACU in one or more airlink processing cards APC. In the inbound direction, every airlink chassis unit ACU receives IQ-packets from radio units RFU and selects the best packet for processing. If a valid message is decoded it is forwarded to the network chassis unit NCU where the final selection between packets received from several airlink chassis units ACU is made.

One of the advantages of the embodiment of FIG. 7 is that the centralized outbound L2/L1 processing guarantees synchronization between the radio blades RB. In addition, centralized inbound upper L2 processing means that no mobility management is needed to locate the Mobile Station in the system. Furthermore, if a system clock is available on the network chassis unit NCU, it can process outbound slots in advance and system delays can be made smaller (less buffering is needed to compensate for variations in inbound delays). In addition, the reliability of the system may be further improved by adding a reliable link between network chassis unit NCU and airlink chassis unit(s) ACU to guarantee that critical information maintained by the network chassis unit NCU (like channel setup tables) can be reliably transmitted to every airlink chassis unit ACU (needed in inbound lower L2 and L1 processing).

One reason that the embodiment of FIG. 5 is sometimes more desirable than the embodiment of FIG. 7 is that, in the embodiment of FIG. 5, in the outbound direction there is less traffic from the network chassis unit NCU to airlink chassis unit(s) ACU. In addition, because inbound and outbound processing are not symmetrical in the embodiment of FIG. 7, further modifications to the interfaces between the digital signal processor and CPU may be needed for certain embodiments.

FIG. 8 is a diagram similar to FIGS. 2 and 6 and illustrating the functional tasks for the embodiment of FIG. 7. In accordance with this method, raw I/Q sample packets are simulcast to all radio blades RB directly from the network processing card NPC and do not need to go through the extra network tasks. Inbound message processing is similar to that of FIG. 6. The basic premise for the method of FIG. 8 is that, by eliminating the need to transfer the data to another board through the network, this will reduce the delay time for transmission of outbound protocol data units PDU. Also, since the outbound data is simulcast, the overall network traffic will be acceptable.

The embodiment of FIGS. 7 and 8 is particularly advantageous in a system where delays can be minimized. To improve the architecture, the network chassis unit NCU/network processing card NPC can be provided with access to a system clock and a copy of slot and frame counters, such that slot requests from airlink chassis unit ACU to network chassis unit NCU are generally not needed.

In the embodiment of FIG. 9, all of the L2 and L1 processing is located on the network chassis unit NCU in one or more network processing cards NPC. Outbound IQ-packets are simulcasted from network processing cards NPC to all of the radio blades RB and inbound IQ-packets are transmitted from every radio blade RB back to the network processing cards NPC, where the digital signal processors make the final selection between the packets.

One of the advantages of the embodiment of FIG. 9 is that the centralized L2/L1 processing provides a greater likelihood of synchronization between the radio blades RB. In addition, because all of the IQ-packets are forwarded to the network processing card NPC, no mobility management is required to locate a mobile unit in the system. In comparing the embodiment of FIG. 9 to those of FIGS. 5–8, in the embodiment of FIG. 9 there is a relatively substantial amount of traffic between the network chassis unit NCU and the airlink chassis unit ACU in that every radio blade RB transmits and receives an IQ-packet once every time period, which in one embodiment is every 7.5 mSec. In addition, in the embodiment of FIG. 9, the digital signal processor has to possibly be able to store tens of IQ-packets for the selection process, which may be limiting because of the limited data memory on the digital signal processor. Thus, in some cases, the embodiments of FIGS. 5–8 may be preferable over the embodiment of FIG. 9.

The primary difference between the method of FIGS. 5 and 6 and the method of FIGS. 7 and 8 is that in the method of FIGS. 5 and 6, protocol data units PDU are generated at the network processing card NPC and sent to the airlink processing card APC. The digital signal processors on the airlink processing card APC then convert these protocol data units PDU to raw I/Q samples to send to the radio blades RB. In the method of FIGS. 7 and 8, the digital signal processors on the network processing card NPC convert the protocol data units PDU to raw I/Q samples and are then sent to the radio blades RB directly from the network processing card NPC, thus bypassing the airlink processing card APC.

Timing is an important aspect of the simulcast method of the present invention. In one embodiment, the voice specification allows approximately 14 mSec to process a slot request and respond with the protocol data unit PDU data for outbound requests. For the inbound protocol data units PDU, one significant requirement is that the data is removed from the digital signal processor before the next protocol data unit PDU arrives 15 mSec later. There are two additional differences of the methods of FIGS. 5–8 when compared to a non-simulcast system. One is a need to reduce the overall voice packet delay time, and the other is the packet data requirement.

It is desirable to reduce the amount of voice delay in the system. For example, in a system where data transfers operate on the 15 mSec (Slot Request) and 15 mSec+7.5 mSec (half-slot) timing reference, a delay decrease of at least 7.5 mSec is of particular value. Two areas are noted in which delay reduction may occur. For the first area of possible delay reduction, in one embodiment, the outbound timing allows for a 14 mSec packet delay between the time when a slot request is made at the digital signal processor and when the data has to be delivered to the digital signal processor. This can be reduced to a 7.5 mSec delay. For the second area of possible delay reduction, in an embodiment where the digital signal processor initially uses 15 mSec for SRC filtering, it may be possible to reduce this time to 7.5 mSec.

For a simulcast system, a slot request boundary may represent the time at which all outbound packets must have arrived at the network processing card NPC for processing in the next slot. In one embodiment, 7.5 mSec is allocated for processing the outbound protocol data units, delivering them to the airlink processing card APC, and writing the protocol data units PDU into the digital signal processor.

The voice packets that arrive from the integrated site controller ISC are also synchronized to the same slot boundaries and as such will arrive at a fairly consistent time relative to the slot request boundaries. To take advantage of the minimum amount of delay that the outbound voice channel procedure message needs to wait before this slot request, JITA Procedures may be implemented.

Packet data has additional requirements to that of voice. For voice processing, the outbound data is not dependent upon the inbound data, and can essentially operate as two independent processes. For packet data PRAP messages, the outbound data is dependent upon the inbound data and, as such, it generally does not send its outbound data until it has received and processed the inbound data.

The inbound timing may be the same for the method of FIGS. 5 and 6 and the method of FIGS. 7 and 8. The inbound timing is more complex because, depending upon the type of message (random-access procedure RAP, associated control procedure ACP, etc.), the digital signal processor processing may take a variable amount of time. Also, the delivery of the data to the airlink processing card APC is dependent upon when the IQ packet arrives at the digital signal processor. Any amount of timing variation on the input results in a timing variation when the data is delivered to the airlink processing card APC.

To reduce the amount of network messages being sent to the network processing card NPC, the protocol data unit PDU is generally not sent to the network processing card NPC as soon as it arrives at the airlink processing card APC. Instead, it is bundled and sent at particular intervals. Protocol data unit PDU bundling is described in more detail below.

Because the PRAP messages are generally sent as soon as possible and other messages may not be available for up to 7 mSec later, a protocol data unit PDU bundle may be sent from the airlink processing card APC to the network processing card NPC at every 7.5 mSec interval. Any protocol data units that are available in the first 7.5 mSec (particularly PRAP protocol data units) can be sent at the half-slot boundary and any protocol data units available in the second 7.5 mSec can be sent at the slot boundary.

Although in some embodiments a delay of up to 40 mSec may occur, this is generally a rare worst case. Almost all messages, with the exception of associated control channel ACC and packet data, will be available in the first half slot. Also, the time to transfer from the airlink processing card APC to network processing card NPC and process may typically be around 1 mSec.

In one embodiment, there may be up to seven radio blades RB operating at any given time, six dedicated to voice and one dedicated to packet data. Since some tasks require the use of UDP, it is possible that network activity by a process can delay the transmission/reception of critical packets from a critical activity and, as such, needs to be considered as a potential for delay. One problem with estimating the execution time is that a number of events may occur randomly and asynchronously. The slot requests and inbound data occur on every 15 mSec boundary, but many other events may sometimes be considered as random occurrences that can occur at any time and together. For example, during a 15 mSec interval, a voice packet can arrive from the integrated site controller ISC, a voice packet can be sent to the integrated site controller ISC, a dedicated control channel DCC packet can arrive from the integrated site controller ISC, and a handover message can be sent to the integrated site controller ISC.

To reduce randomness, slot requests can be processed on the start of every 15 mSec-slot request boundary and data transfers from the digital signal processor can be made to occur on every 15 mSec slot and half-slot boundary. Handover messages can also be transferred with every half-slot packet from the digital signal processor. The result is that most random events will be certain asynchronous and pseudo-events. This distribution has the effect of processing the outbound data in one half-slot period and processing inbound data in the second half-slot period with the exception of the occasional associated control channel ACC messages. This method can also be used for the timing specification for packet data.

To implement the timing for the method of FIGS. 5 and 6, in one embodiment the slot requests will not be generated by the digital signal processor; rather, they will be generated from a 15 mSec clock on the network processing card NPC that is synchronized to the integrated site controller ISC. This means there will be no read from the digital signal processor for slot requests. In one embodiment, it is assumed that to send a packet of data requires 50 $\mu$Sec and to receive a packet of data requires 120 $\mu$Sec. To make more efficient use of the messaging, packet bundling is utilized, as will be described in more detail below.

In summary, in packet bundling, the packets for all radio blades RB will be combined and sent as one to the airlink processing card APC. The result is only one call to a function muxSend (for sending packets) and one call to a Filter Function (for receiving data). This applies to both the network processing card NPC and airlink processing card APC, for both directions. Only messages sent to/from the integrated site controller ISC are sent individually. This means there will only be one network send and receive for all seven radio blades RB and not seven individual send/receives. The network processing card NPC execution times are generally considered to be a limiting factor. Because of the extra time to go through the network, the total execution time to complete inbound and outbound events increases. However, some of this processing is done on the airlink processing card APC and some is done on the network processing card NPC. Since the network processing card NPC has to process the additional asynchronous events, its execution time is important for finishing within the 7.5 mSec window. Handover messages are generally combined with the inbound data.

For the method of FIGS. 7 and 8, in one embodiment, the I/Q samples are sent to all radio blades RB directly from the network processing card NPC using a multicast address on the Ethernet packets. The inbound processing and delays may generally be similar to those of FIGS. 5 and 6. Two important aspects for the method of FIGS. 7 and 8 are the network processing card NPC execution times and the effect of extra data on the network between the network processing card NPC and the airlink processing card APC.

To implement the timing for the method of FIGS. 7 and 8, in one embodiment the slot requests will not be generated by the digital signal processor; rather, they will be generated from a 15 mSec clock on the network processing card NPC synchronized to the integrated site controller ISC. This means there will be no read from digital signal processor for slot requests. In one embodiment, it is assumed that to send a packet of data requires 50 $\mu$Sec and to receive a packet of data requires 120 $\mu$Sec. Only the inbound data has the extra send/receive. To make more efficient use of the messaging, packet bundling is utilized on the inbound direction, as will be described in more detail below. In one embodiment, inbound processing is distributed between the airlink processing cards APC and the network processing cards NPC. Because of the extra time to go through the network, the total execution time to complete inbound events increases. Since some of this processing is done on the airlink processing cards APC and some is done on the network processing cards NPC, the resulting network processing card NPC margins should only reflect the processing done on the network processing card NPC. Handover messages are generally combined with the inbound data.

In one embodiment of the methods of FIGS. 5–8, all of the radio blades RB are synchronized with each other to within 10 $\mu$Sec. All radio blades RB will be provided with a 1 pps timing signal from the integrated site controller ISC. The 1 pps timing signal is also referred to as a 1 pps event. Further, one or more radio blades RB will be provided with a slot and frame number, which will be distributed over the Ethernet to the radio blades RB as an Ethernet SYNC message. All of the radio blades RB which receive an Ethernet SYNC message will set their slot and frame counters to the values provided in the Ethernet SYNC message at the next 1 pps event. This indicates that the 1 pps events, or timing signals, should be distributed to all radio blades RB within 10 $\mu$Sec of each other. Generation of the Ethernet SYNC message will be done at the network chassis unit NCU either by a component FPGA or by the CPU. The Ethernet SYNC message may then be broadcast to all radio blades RB using a multicast address. Alternatively, all the radio blades RB may be synchronized in a selective manner by sending an Ethernet SYNC message to one or more radio blades immediately before one particular 1 pps event and by later sending another Ethernet SYNC message to one or more other radio blades. The slot and frame numbers contained in any Ethernet SYNC message must correspond to the current running count of slot and frame numbers so that any radio blade may be individually synchronized with the rest of the system.

In one embodiment, the NCU and each ACU are preferably provided with a time base, which includes a running slot and frame count. Synchronization of the NCU time base will take place according to the following procedures. If the network processing card NPC is not synchronized, it will wait for the reception of a Ethernet SYNC message containing the slot and frame adjust message. The network processing card NPC ISR will respond to a periodic interrupt every 15 mS and read a register on the component FPGA. When the 1 pps bit on the component FPGA becomes set (will only be set for an interrupt, which corresponds to a 1 pps event), the network processing card NPC will start using the slot number from the slot adjust message as the new slot number. The slot number will be incremented at every 15 mS interrupt. Synchronization of the ACU time base takes place using a procedure, which is substantially identical to that used for synchronization of the NCU.

In the non-simulcast system, the radio blades RB send an inbound I/Q packet with a slot number to the digital signal processor. The digital signal processor then sends this slot number to the airlink processing card APC as part of the slot request. The airlink processing card APC will then respond with a protocol data unit based on the slot number. For the methods of FIGS. 5–8, the amount of time delay introduced by sending a slot request from the airlink processing card APC to the network processing card NPC would generally be greater than a desired time delay. That, combined with the network delays, would result in a considerably varying slot request message at the network chassis unit NCU. The solution is that the slot request will be generated by the synchronized 15 mSec clock on the network chassis unit NCU and not by the digital signal processor. The remaining issue is that the network processing card NPC needs to know which slot to process as part of the slot request. The method by which the network processing card NPC becomes synchronized with the proper slot number is to have the network processing card NPC send a PWM signal from the component FPGA on the LAN interface card LC to a component FPGA on the network processing card NPC. This PWM signal will contain the 15 mSec (possibly 7.5 mSec) clock information and the 1 pps information.

One problem with one embodiment of the non-simulcast system is that, when a channel setup comes in from the integrated site controller ISC, the Tx and Rx digital signal processor cores get updated with this new channel setup table simultaneously. Outbound slot processing is delayed from the inbound slot processing by a couple of slots. This means the outbound slot processing has a table that is not yet up to date. For voice, this is generally not a problem because there is enough of a delay between when the channel is set up and actually used. For packet data, this is no longer the case because of the tighter coupling between the inbound and the outbound protocol data units PDU. One solution would be to have the digital signal processor store a history of channel tables but, due to space limitations, this may not be an option. Another solution is to send a new channel table with every set of slot request protocol data units. This has several benefits; one is that it keeps the channel table synchronized and up to date with the slot requests. The second is that it eliminates a network send call during the channel setup request on the network processing card NPC, thus reducing the costly channel setup time.

As noted above, the methods of FIGS. 5–8 utilize a bundling technique so as to make more efficient use of the network. Thus, in one embodiment, the protocol data units PDU for each of the radio blades RB are generally combined and sent together as one Ethernet packet. The result is only one muxSend for sending the data and only one call to the Filter Function for receiving data. This bundling is done per radio unit RFU, which is processed by a single airlink processing card APC. Protocol data unit PDU bundling can be employed for sending data from the network processing card NPC to the airlink processing card APC for outbound slot requests and from the airlink processing card APC to the network processing card NPC for inbound data indications. The protocol data unit bundling is handled by the message router MR on the network processing card NPC and the digital signal processor Reader task on the airlink processing card APC.

The methods of FIGS. 5–8 rely on the network interface for protocol data unit PDU exchange, as well as for sending either protocol data units PDU or Raw I/Q samples. In one embodiment, all network activity on an airlink processing card APC goes through a Motorola FCC Ethernet Driver and is scheduled through the tNetTask. For each packet received and transmitted, a "job" is scheduled in the tNetTask. When the time comes for that job to be executed, the data is then sent to the driver for transmission or reception. All sent data to/from the airlink processing card APC will be made from a call to muxSend. Since the entire network stack operates under the same tNetTask, any TCP/IP activity will also need to be scheduled with this protocol data unit PDU activity and, as a result, the protocol data unit PDU packet transmission/reception may become delayed longer than expected because it needs to wait for the TCP/IP packet processing. In one embodiment, for all synchronous and asynchronous activity, the maximum potential delay for a single conflict would be 120 $\mu$Sec on a packet reception and 170 $\mu$Sec for an ICMR activity from the pseudocritical task. The network processing card NPC margins are large enough to accommodate these delays.

Because the protocol data unit PDU transmission takes place over a distributed network, one consideration is to provide a reliable link. To generate a reliable link, packet loss or link failure is detected and retransmission on a packet failure is provided.

The switch configuration for the systems of FIGS. 5–8 is set up such that the 0x1180 packets from the radio blades RB are not transmitted on the interface between the airlink chassis unit and the network chassis unit. In the outbound direction, all protocol data unit PDU bundled Ethernet packets have a multicast address associated with them. In the inbound direction, all protocol data unit bundled Ethernet packets have a unicast address associated with them.

A message format and type are provided for the airlink processing cards APC and network processing cards NPC that represent the accumulation of multiple protocol data units PDU (Bundle) destined for each airlink processing card APC. The code for the airlink processing card APC and network processing card NPC is implemented such that the same messages arrive at the appropriate message queues. The source of the message sent to the message queue is different from a non-simulcast system, as the Ethernet routines use a multicast address instead of a unicast address. The message router MR task accumulates the protocol data units from each sector. Once every protocol data unit PDU is received, a single protocol data unit PDU is selected based on the RSSI metrics. It is this protocol data unit PDU that is sent on to the appropriate task.

The digital signal processors perform the inbound message filtering. To do this, the digital signal processors are informed of the addition or removal of a radio blade RB that they will need to process. This generally requires a flag or bit field in a message that is periodically sent to the digital signal processor.

In contrast to the non-simulcast system, for the methods of FIGS. 5–8, the digital signal processors do not generate the slot requests at the 15 mSec slot request boundary. However, by providing this interrupt, the system can keep a check on what slot number the digital signal processor is processing and what slot number the system thinks it should be processing, thus alerting of an error under these conditions.

The digital signal processor also sends an RSSI metric set with every inbound message. This is a desired criterion for inbound message selection at the network chassis unit NCU. To simplify the interface, the digital signal processor sends an inbound message with RSSI metric at every slot interval, but only sets the valid sync flag for valid protocol data units. This allows the interface to always be sending the exact type of information each time without having to compensate for variable-length messages.

For the methods of FIGS. 5–8, in general, the network management includes the association of a network processing card NPC with a group of airlink processing cards APC and radio unit RFUs relating to a particular sector. This includes properly assigning multicast addresses to the appropriate sector. The code bases for the airlink processing card APC and network processing card NPC may be identical, but each is able to recognize itself to allow particular tasks to be started. The network management is also responsible for informing the appropriate network processing card NPC and airlink processing card APC of additional radio blades RB.

For the method of FIGS. 5–6, the code to support the digital signal processor Reader and Writer accumulates the protocol data units PDU from each digital signal processor and then performs a muxSend instead of an msgQSend for transmitting the protocol data units PDU. For receiving, the digital signal processor Writer WT receives a message from the Filter Function, instead of from the message router task MR, as is done in the non-simulcast system. In further comparison to the non-simulcast system, in the method of FIGS. 5–6, the message router task MR sends through a muxSend instead of a msgQSend. The received data continues to arrive via the message queue from the Filter Function. The network management is generally aware of digital signal processors only on the airlink processing card APC and generally not on the network processing card NPC.

For the method of FIGS. 7–8, the code to support the digital signal processor Reader accumulates protocol data units PDU from each digital signal processor and then performs a muxSend, instead of a msgQSend, for transmitting the protocol data units PDU to the network processing card NPC, as is done in the non-simulcast embodiment. The digital signal processor writer WT is similar in both cases. Also, the digital signal processor loads are set up to support a single inbound and a single outbound processing for each core. This embodiment may require two outbound loads on the network processing card NPC and two inbound loads on the airlink processing card APC, resulting in a different configuration for the airlink processing cards APC versus the network processing card NPCs. The network management is generally aware of outbound digital signal processors on the network processing card NPC and inbound digital signal processors on the airlink processing card APC for setup and configuration.

For the embodiments of FIGS. 5–8, the packet data operates on an independent network processing card NPC from the voice processing. The network processing card NPC provides a 15 mSec interrupt to the microprocessor PROC that is synchronized to the integrated site controller ISC 1 pps clock. The network processing card NPC may also support the reading of the slot number that is associated with this slot request.

For the embodiments of FIGS. 5–8, the inbound packet selection is the method by which the inbound messages from the radio units RFU and airlink chassis units ACU are combined into one message representing that sector to send to the integrated site controller ISC. Multiple airlink chassis units ACU and multiple radio units RFU can be distributed throughout a sector. For multiple radio units RFU, the digital signal processor is responsible for selecting the appropriate inbound packet. The result is a single inbound message from each airlink chassis unit ACU representing a particular sector.

For multiple airlink chassis units ACU, the network processing card NPC receives an inbound message from each airlink processing card APC representing a particular time slot and sector. This inbound message occurs at every half-slot boundary regardless whether there is an actual message to deliver and is possible at a slot request boundary for the associated control channel ACC type messages. Appended to each inbound message are the channel quality measurement values for that particular slot. This channel quality metric includes RSSI, I+N and sync errors. The sync error flag is used to first compare the time slots, and any message with an invalid sync is ignored. The RSSI and I+N value is then used to compute the SQE for that particular slot from each airlink chassis unit ACU. The airlink chassis unit ACU with the largest SQE has its inbound message selected as the appropriate message to process and send onto the integrated site controller ISC. In addition to selecting the inbound message, the selected channel quality set is also the set used for that particular time slot to form the handover message. In one embodiment, this metric set is sent to the network chassis unit's new base radio management BRM entity where it accumulates 24 sets of measurements and then sends out as a handover measurement report.

Based on the network processing card NPC execution times, the method of FIGS. 5–6 when compared to the method of FIGS. 7–8, in some embodiments provides a more efficient process by offloading the time-consuming digital signal processor writing to another processor. Although, in one embodiment the total cycle time is longer for the method of FIGS. 5–6 by 170 μSec, the potential for delays is reduced by not having to compete with the CPU for so many other things. The efficiency of the method of FIGS. 5–6 is realized because it is sometimes much faster for the CPM module of the network processing card NPC to send Ethernet protocol data units PDU to the airlink processing card APC than it is for the network processing card NPC CPU to write the protocol data unit PDU data into the components DSP.

In certain embodiments, both the method of FIGS. 5–6 and the method of FIGS. 7–8 achieve a desired 15 mSec overall processing delay. The software of the method of FIGS. 7–8 is slightly more complex because the separation of inbound and outbound are processed on separate boards. In addition, in certain embodiments, both the method of FIGS. 5–6 and the method of FIGS. 7–8 gain an additional 160 μSec in delay reduction over the non-simulcast system because the slot requests are generated at the network processing card NPC and not from the digital signal processors.

The capacity of the methods and systems of FIGS. 5–8 can generally be improved by improving the time it takes to process a protocol data unit PDU for each radio blade. Since the number of radio blades RB multiplies this time in terms of the overall processing time of the overall system, any time savings translates into multiplied savings. In addition, the channel setups of the systems update the digital signal processor setup tables when the digital signal processor gets the setup request message. If this channel setup information is sent with the slot requests, then it eliminates a network send.

For the methods of FIGS. 5–8, the messages that are sent between the airlink processing card APC and digital signal processor are service access point SAP messages. Such messages generally work with the iDEN specifications. The protocol data units PDU are combined with additional information to make up the service access point SAP. It is the service access point SAP that is generated by the slot request and written into the digital signal processor.

To implement the methods of FIGS. 5–8, a message is used specifically to represent the service access points SAP sent to the airlink processing cards APC and the service access points SAP sent to the network processing card NPC. The message represents the accumulation of service access points SAP for each radio unit RFU on a particular airlink processing card APC. Depending upon the configuration, in an embodiment with seven radio blades RB, there can be up to seven service access points SAP represented per message, one for each radio blade RB. Each service access point SAP would be associated with a different base radio identification BrId.

Radio blades RB or radio units RFU can be inserted dynamically into the systems of FIGS. 5–8; either at system startup or after the system has already been running. Setting up and managing the starting and stopping of radio blades RB is handled by the iRBS and iRBC tasks running on an interface card IC and a LAN interface card LC, respectively. Setting up and managing the base radio session BRS and airlink processing card APC channel setup tables is managed by the base radio session BRS on the LAN interface card LC and the channel setup CS task on the network processing card NPC. Several different startup scenarios may occur, each of which may require a slightly different action on the part of the system. These scenarios are all based on starting multiple radio unit RFUs on multiple airlink chassis units ACU for the same carrier. Four scenarios are discussed in more detail below, the first three of which are illustrated in FIG. 10.

Figure 10:
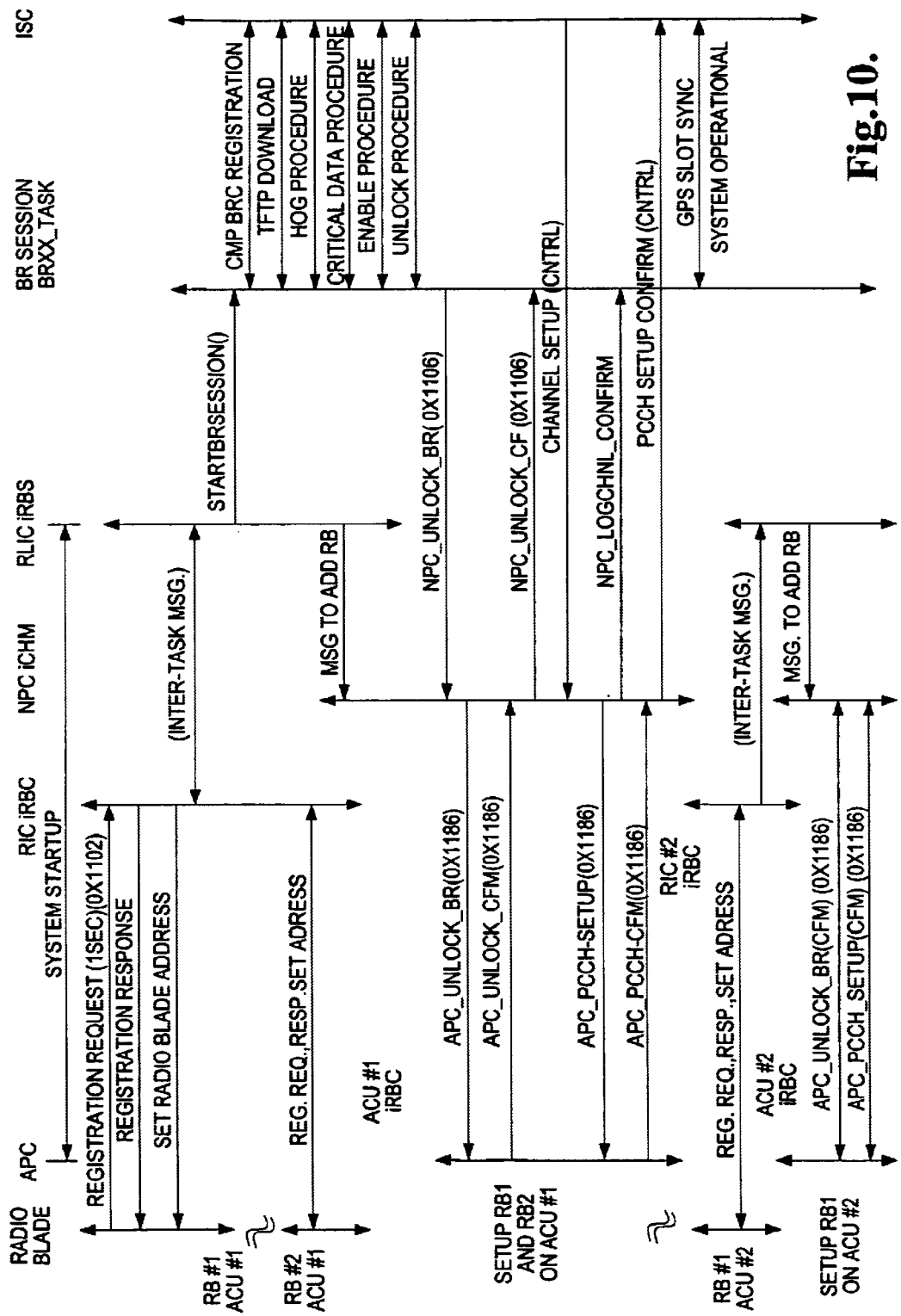
FIG. 10 is a diagram illustrating initialization messages for various scenarios.

As illustrated in FIG. 10, for a first scenario, a first radio unit RFU is started in a first airlink chassis unit ACU, which is designated as ACU #1 in FIG. 10. This is the case of the very first radio blade RB, which is designated as RB #1 in FIG. 10. In this case a base radio BR session will need to be started with the integrated site controller ISC, the network processing card NPC channel setup CS will need to be informed of the channel tables, and the airlink processing card APC will need to be setup for the first time with the channel tables. In the embodiment of FIG. 10, all of the radio blades RB are on the same carrier and are assigned to the same base radio BR and the same sector.

As further illustrated in FIG. 10, for a second scenario, a second radio unit RFU is started on the first airlink chassis unit ACU. In this case, only the airlink processing card APC needs to be informed that another radio blade RB (designated as RB #2 in FIG. 10) is present. The airlink processing card APC will set up the digital signal processor so that it is aware of another radio unit RFU to process. In this embodiment, neither the base radio session BRS nor the network processing card NPC channel setup CS Task generally needs to be made aware of this. In this scenario, the base radio BR has not been unlocked yet.

As further illustrated in FIG. 10, for a third scenario, the first radio unit RFU on the second airlink chassis unit is started after the base radio BR is unlocked. In this case, the network processing card NPC channel manager CM needs to set up the channel tables on the new airlink processing card APC.

For a fourth scenario (not shown), the second radio unit RFU is started on an airlink chassis unit ACU that is already operational. In this case, only the digital signal processor needs to be informed that it has another radio blade RB to process. In this case, the digital signal processor needs to make a decision as to which inbound I/Q packet to accept.

The message from the iRBS task to add an additional radio blade RB can come at any time. In one embodiment, if the base radio session BRS is still locked, then the channel setup CS will generally have to wait until it receives a message UNLOCK trigger from the base radio session BRS before setting up the airlink processing card APC. Once the base radio BR is in the unlocked state, all additional radio blades RB will be handled by the channel setup CS on the network processing card NPC.

It should be noted that, in the embodiment described above, there could be up to seven radio blades RB per radio unit RFU, but each radio blade RB in a radio unit RFU is associated with a different base radio session BRS. While FIG. 10 is illustrated for a single base radio session BRS, it will be understood that all others will follow the same sequence independently. The additional radio unit RFU on a single airlink chassis unit ACU in FIG. 10 represents the addition of the next radio blade RB that is associated with an already initialized base radio BR. In this implementation, it is assumed that, as long as at least one radio blade RB is operational, the base radio BR will be considered operational. It should also be noted that, in this embodiment, the radio blade RB synchronization does not generally take place until airlink chassis unit ACU and network chassis unit NCU synchronization has taken place.

One difference between the model of FIG. 10 and the non-simulcast system is the addition of the radio blade RB Add messages from the iRBS task. The channel setup CS task determines if it is the first radio unit RFU. If it is, then it sets up the channel tables on the new airlink processing card APC. If it is the second radio unit RFU on the first airlink processing card APC, then it informs the digital signal processor of the additional radio blade RB to process. The GPS Slot/Sync procedure is also different, as will be discussed in more detail below.

Upon power-up, the network processing card NPC determines that it is a network processing card NPC by reading a hardware register. In one embodiment, once the network processing card NPC has determined that it is a network processing card NPC, all tasks except the Dsp Reader RT (RFN_DSPR_TASK), Dsp Writer WT (RFN_DSPW_TASK), and message router MR (RFN_DSPX_TASK) tasks are started.

Upon power-up, the airlink processing card APC determines that it is an airlink processing card APC by reading a hardware register. Once it has determined that it is an airlink processing card APC, all tasks except the random-access procedure RAP, associated control procedure ACP, inbound message task INTASK, outbound message task OUTTASK, message router MR, and all packet data related tasks will be started.

In addition to the normal startup sequence, in one embodiment, the interface card IC also makes sure the airlink chassis unit ACU is synchronized with the network chassis unit NCU before allowing the radio blades RB to become initialized. The Timing component FPGA on the interface card IC handshakes with the LAN interface card LC to synchronize itself. In one embodiment, the CPU on the interface card IC periodically checks the status of the Timing component FPGA and, when a sync lock is detected, it proceeds with the radio blade RB initialization. In this embodiment, inbound messages are generally not sent from the airlink chassis unit ACU to the network chassis unit NCU unless synchronization has been achieved.

In the non-simulcast system, the slot number on the radio blades RB is set by the base radio session BRS. The sequence is started by the base radio session BRS sending a GPS Slot/Frame Request, and waiting for a GPS Slot/Frame response with the slot number. When the integrated site controller ISC sends a GPS slot/frame response message with the current slot number, the base radio session BRS sends an Ethernet message to the radio blade RB to set the slot number. This method is acceptable when there is only one radio blade RB associated with one base radio BR. However, since there are multiple radio blades RB per base radio BR for the simulcast methods of FIGS. 5–8, the radio blade RB management task sends the message to the radio blade RB to set the slot number.

Figure 11:
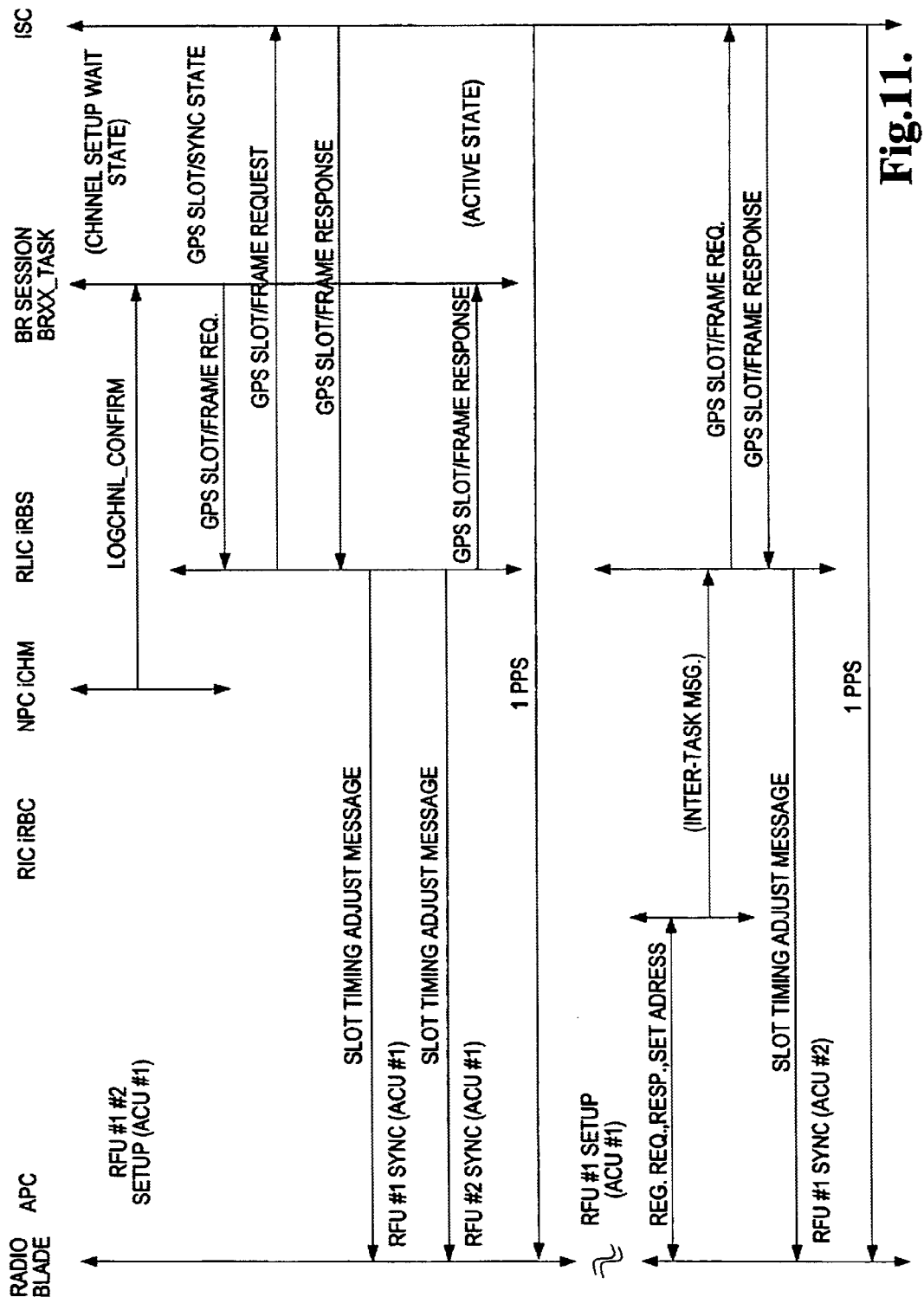
FIG. 11 is a diagram illustrating a sequence of events that occur as part of a procedure that is executed for each radio blade insertion.

FIG. 11 is a diagram illustrating the sequence of events that take place as part of the GPS Slot/Sync procedure that is executed for each radio blade RB insertion. In FIG. 11, all radio blades RB are on the same carrier and assigned to the same base radio BR and same sector. As illustrated in FIG. 11, upon entering the GPS Slot/Sync state, the base radio session BRS sends the GPS Slot/Frame Sync message to the iRBS task. This triggers the iRBS task to send a GPS Slot/Frame Request to the integrated site controller ISC, and the integrated site controller ISC responds with the frame and slot number in the GSP Slot/Frame Response. If this is the first radio blade, then the iRBS task waits for this trigger from the base radio session BRS so that it can maintain the proper state.

As additional radio blades RB are initialized for a particular base radio BR, the iRBS task requests a slot/frame number from the integrated site controller ISC. This GSP Slot/Frame response is a multicast address and is sent to all base radio BRs in the system. Normally under such circumstances, the Distributor task could route a message to each base radio session BRS, but since the iRBS task is responsible for all radio blades RB, in this embodiment, a single message to this task is utilized and considered to be sufficient. The Slot and Frame number is set in the component FPGA at the following 1 pps following the Slot Timing Adjust message.

For the methods of FIGS. 5–8, a channel setup task CST running on the network processing card NPC is responsible for managing the channel tables for all airlink processing cards APC in the system. In the channel setup task CST of the non-simulcast method, the method writes information to the digital signal processor on reception of Logical Channel Assignments, channel setups CS, and base radio BR Unlock triggers. Since, in the simulcast methods of FIGS. 5–8, the digital signal processors are not located on the network processing card NPC, this information needs to be sent to the airlink processing card APC for loading into the airlink processing card APC.

Referring to FIG. 10, the 0x1106 messaging is expanded to include messaging to/from the airlink processing card APC for setting up this same information. The 0x1106 messaging is used for the Channel Assignments and base radio BR Unlock Triggers, which, in this embodiment, generally occur only once during initialization. Any channel setup CS Requests received from the integrated site controller ISC are generally sent to the airlink processing card APC as part of the slot request bundle to reduce unnecessary net traffic. Upon reception of a channel setup request, the local (network processing card NPC) channel table is updated to reflect the changes.

Channel setup tasks CST respond to a number of different types of messages. These will generally be 0x1106 messages between network processing card NPC and the system LAN interface card LC and 0x1186 messages between airlink processing cards APC and network processing cards NPC. One of these messages is a trigger to unlock the base radio BR, which is sent from the base radio session BRS to the network processing card NPC. Another message is for sending system parameters to the airlink processing card APC, which is sent from the network processing card NPC to the airlink processing card APC. Another message is for confirmation on setting system parameters, which is sent from the airlink processing card APC to the network processing card NPC. Another message is confirmation on unlock, which is sent from the network processing card NPC to the base radio session BRS.

An additional message is the confirmation of the logical channel assignment, which is sent from the network processing card NPC to the base radio session BRS. Another message is the trigger to lock the base radio BR on the network processing card NPC, which is sent from the base radio session BRS to the network processing card NPC. Another message is the trigger to lock the base radio BR on the airlink processing card APC, which is sent from the network processing card NPC to the airlink processing card APC. Another message is for signaling the primary control channel setup, which is sent from the network processing card NPC to the airlink processing card APC. Another message is to confirm on the primary control channel setup, which is sent from the airlink processing card APC to the network processing card NPC. Another type of message is to inform of additional radio blades RB being ready, which is sent from the rRBS task to the network processing card NPC, although it should be noted that this is not a 0x1106 message, but a message from the iRBS tasking, indicating to the channel setup task CST that an additional radio blade RB is now ready.

Referring to FIG. 10, the channel setup task will set up the network processing card NPC channel information from an unlock base radio BR message from the base radio session BRS. If this is an initial airlink processing card APC, it will set up the System Parameters on that particular airlink processing card APC. The Filter Function on the network processing card NPC is responsible for forwarding all 0x1106 and 0x1186 messages to the channel setup CS Task. On the airlink processing card APC, the Filter Function is responsible for forwarding all 0x1186 messages to the message router task.

The channel setup CS Task is also responsible for providing the proper channel table to be sent to the digital signal processor after processing each slot request. In one embodiment, there generally needs to be a delay between what is sent to the Tx Core versus what is sent to the Rx Core. This is because the Rx core is processing a different slot from the Tx core at any given time. To implement this, a circular channel table buffer is implemented, as illustrated in FIG. 12.

Figure 12:
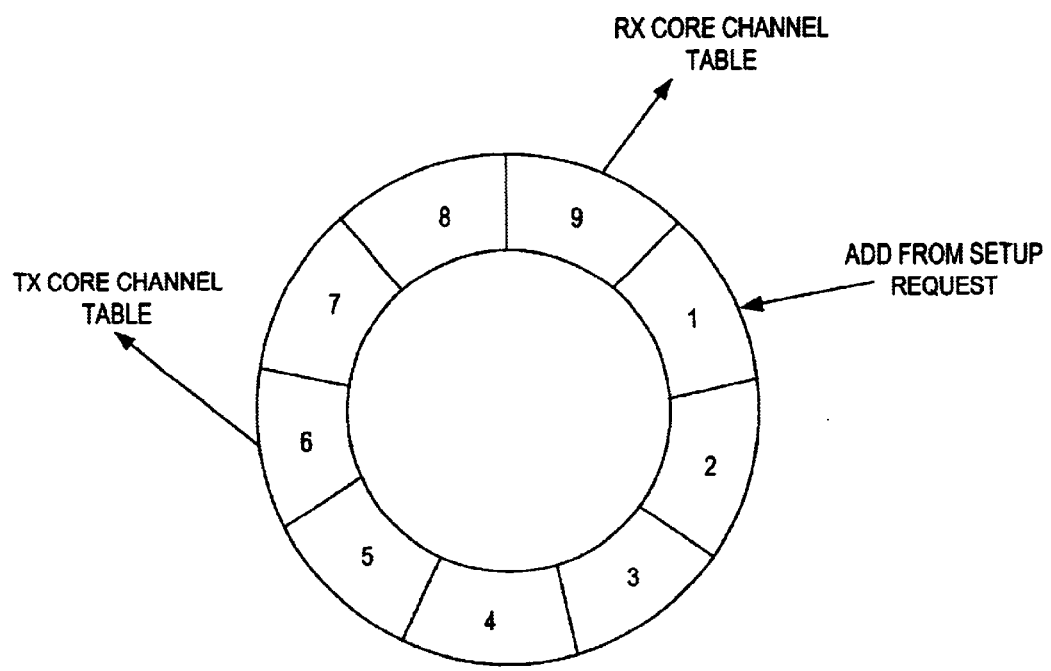
FIG. 12 is a diagram illustrating a channel setup ring buffer.

Referring to FIG. 12, an example is provided in which the numbers in a ring buffer RBUF represent a different slot number. A channel setup CS request would reconfigure the channel table at a particular slot number (e.g., #1). In this example, table #9 would be the previous table that the Rx core is currently using and the #6 would be a delay of N (3 in the example) tables that the Tx core is currently using. By incrementing the buffer pointer at each slot request, the tables for the Rx and Tx core are controlled.

Figure 13:
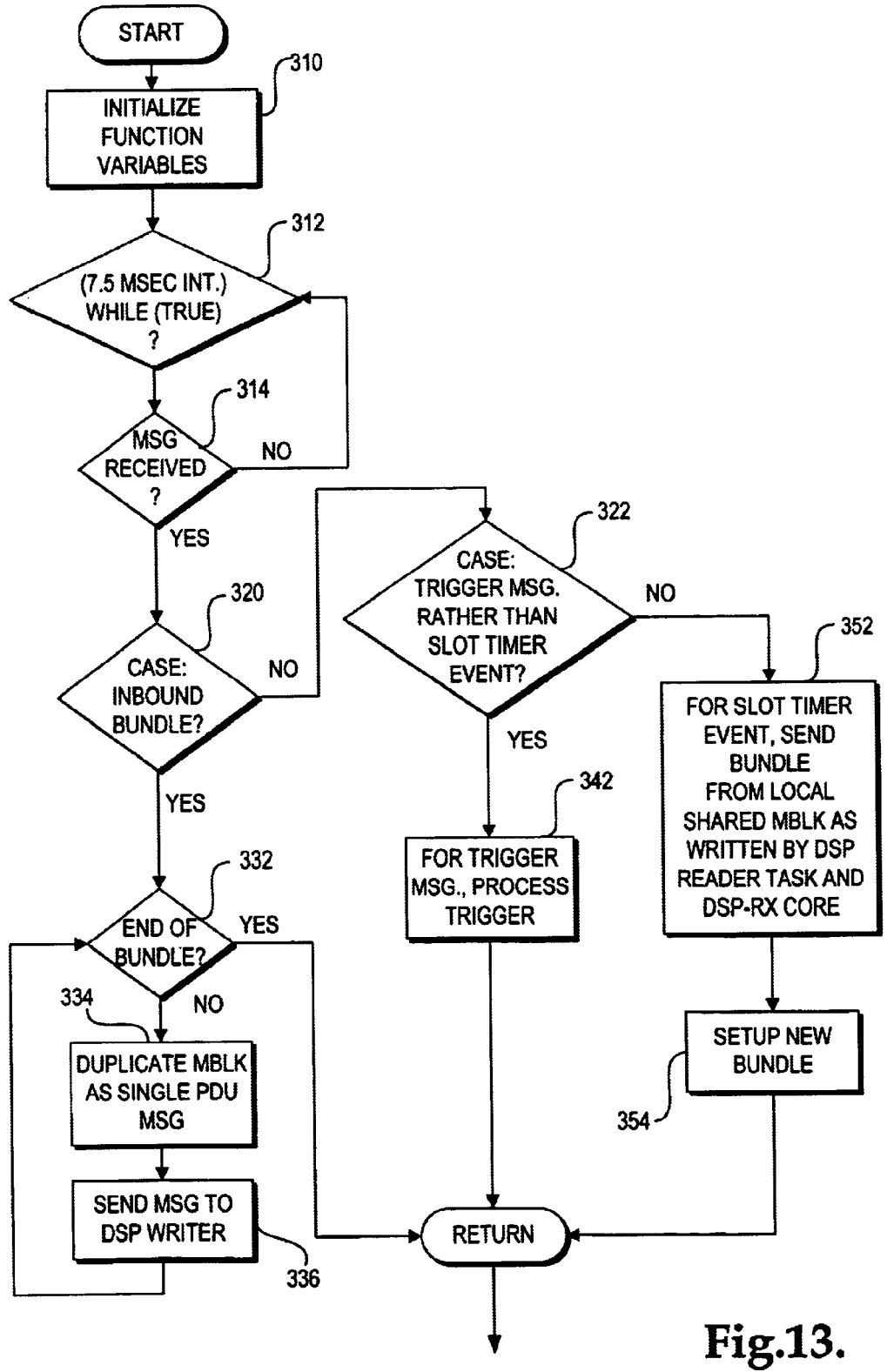
FIG. 13 is a flow diagram of a message router task.

FIG. 13 is a flow diagram of the message router task MR. The message router task MR is responsible for interfacing between the network and the digital signal processor Reader and writer task WT on the airlink processing card APC. This task responds primarily to three events. The first event is for a Slot Request Timer, which is an event in which every 7.5 mSec a bundle is sent to the network processing card NPC. The second event is for Trigger Messages, which are 0x1186 base radio BR control messages from the network processing card NPC. The third event is for Outbound Bundles, which are Outbound bundle messages sent to the digital signal processor writer.

As illustrated in FIG. 13, at a block 310, the routine initializes the function variables. At decision blocks 312 and 314, the routine enters a loop including a 7.5 mSec delay interval, which continues until a message is received as determined at decision block 314. Once a message is received, the routine proceeds to a decision block 320, where the routine determines whether the received message is an inbound bundle. If the message is an inbound bundle, then the routine proceeds to a decision block 332.

At decision block 332, the routine determines whether the end of the bundle has been reached. If the end of the bundle has been reached, then the routine returns. If the end of the bundle has not been reached, then the routine proceeds to a block 334. At block 334, the routine duplicates the Mblk as a single protocol data unit PDU message. At a block 336, the routine sends the message to the DSP writer, and then returns to decision block 332.

If at decision block 320 the received message is not an inbound bundle, then the routine proceeds to a decision block 322. At decision block 322 the routine determines whether the received message is a trigger message rather than a slot timer event. If the received message is a trigger message, then the routine proceeds to a block 342. At block 342, the routine processes the trigger and then returns.

If at decision block 322 the routine determines that the received message is not a trigger message but is instead a slot timer event, then the routine proceeds to a block 352. At block 352, the routine sends the bundle. At a block 354, the routine sets up a new bundle, and then returns.

In one embodiment, in order to eliminate an extra copy from the digital signal processor reader task to the message router task MR, an API is available to call from the digital signal processor reader task that returns a pointer to the Mblk location where the data should be written. Thus, this is how one local copy of the outbound bundle is shared between the digital signal processor Reader task and the message router task MR. The digital signal processor writer receives messages containing an Mblk, which contains the protocol data unit to write into the digital signal processor. To reduce the changes required over the original digital signal processor writer version, a function is used to provide a method to copy the data in an Mblk to another Mblk. This routine does not actually copy the data; rather, it increments a reference counter to the original Mblk and the Mblk does not get released until after every reference to the Mblk is released. This allows the multiple messages to be sent to the digital signal processor writer with each message referencing the original Mblk, thus eliminating a copy of the protocol data unit PDU.

The digital signal processor reader task RT is responsible for reading the inbound messages from the digital signal processor and adding them to the bundle. To eliminate a copy of the protocol data unit from the digital signal processor Reader to the message router via a message queue, in one embodiment, the digital signal processor reader writes directly to an Mblk that is shared between the message router and the digital signal processor Reader. An API is available that allows function calls to be made to lock the buffer and obtain the location to write to.

The digital signal processor writer task WT receives a single message with an Mblk containing the protocol data unit to write. The digital signal processor writes the protocol data unit PDU to the digital signal processor and frees the Mblk.

The message router MR task processes outbound slot requests or inbound messages independently. The inbound processing is somewhat complex as a result of the need to select from multiple airlink chassis units ACU. In one embodiment, the message router MR task is separated into two separate tasks called outbound message task OUTTASK and inbound message task INTASK. In one embodiment, the OUTTASK receives a single slot request message every 15 mSec on the slot request boundary. The message comes from the slot request timer. The OUTTASK then checks for each active base radio BR that is set up, and calls the appropriate slot request function, and adds the resulting protocol data unit PDU to the outbound message.

Figure 14:
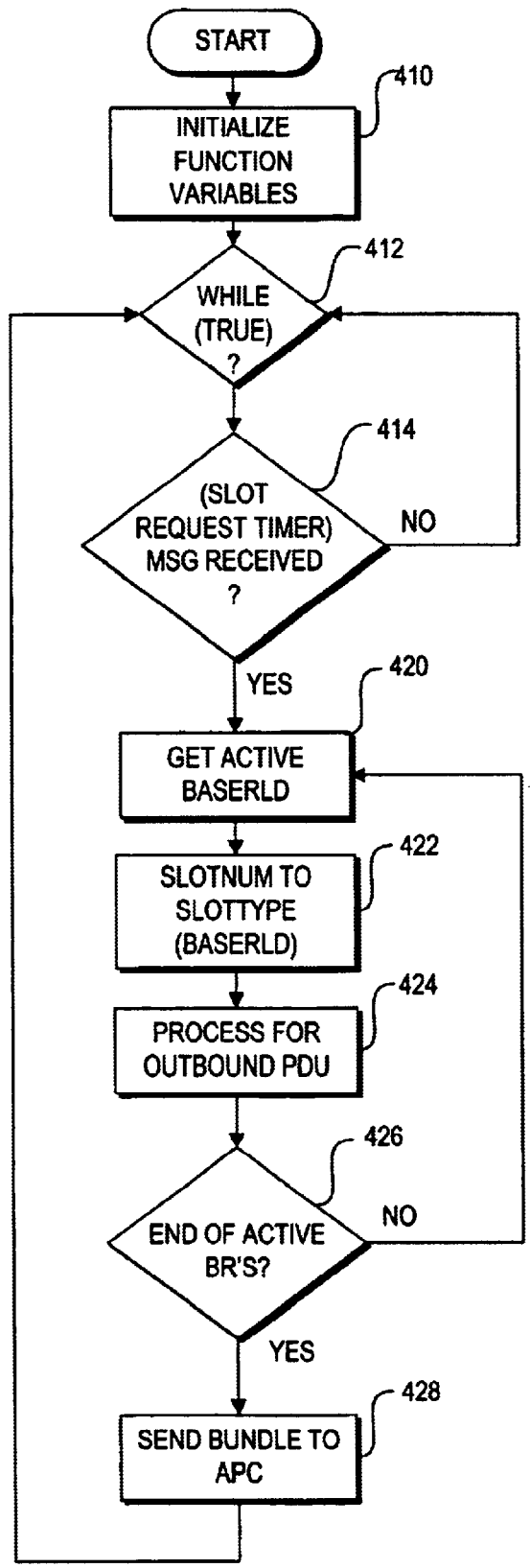
FIG. 14 is a flow diagram of an outbound message processing task.

FIG. 14 is a flow chart of the outbound message task OUTTASK. The block "Process for Outbound SDB" is similar to what is done in a non-simulcast system. As illustrated in FIG. 14, at a block 410, the routine initializes the function variables. At decision blocks 412 and 414, the routine enters a loop as controlled by the slot request timer, to determine when a message is received. When decision block 14 determines that a message has been received, then the routine proceeds to a block 420.

At block 420 the routine gets the active base radio I.D. At a block 422, the routine processes the slot number to slot type information (baseRld). At a block 424, the routine processes for outbound PDUs. At decision block 426, the routine determines if the end of the active base radios have been reached. If not, the routine returns to block 420. If at decision block 426 the end of the active base radios have been reached, then the routine proceeds to a block 428. At block 428 the routine sends a bundle to the airlink processing card APC, and then returns to decision block 412.

In the simulcast system of the present invention, because there can be multiple radio blades RB for a particular channel within listening distance of a mobile device, it is likely that a message sent from the mobile device will be received on multiple radio blades RB. The result is identical messages sent from two sources to the inbound message task INTASK. In one embodiment, these duplicate messages are reduced to a single message before the associated control procedure ACP or random access procedure RAP tasks perform their processing. There are two places the inbound messages need to be selected. One place is the digital signal processor for a particular radio unit RFU, as was previously discussed. The second place is at the inbound message task INTASK for messages from each airlink chassis unit ACU, which is discussed in more detail below.

Upon reception of an inbound message, the inbound message task INTASK receives an Ethernet message with a bundle of protocol data units. There will be a bundle from each airlink chassis unit ACU in the system. If there is only one airlink chassis unit ACU, then the first bundle received will be processed. If there are multiple airlink chassis units ACU in the system, then the inbound message task INTASK is generally made to wait until all bundles are received. An inbound message timer is used to prevent the system from blocking indefinitely on a missing bundle.

Once all of the bundles are received, all protocol data units PDU in the bundle that have the same base radio BRID and slot number will be compared. The protocol data units PDU will first be checked to make sure the sync flag is valid and, if it is not, then that protocol data unit PDU is discarded; otherwise, it is used for the comparison. In one embodiment, based on the RSSI and I+N, the SQE for that slot will be computed. The protocol data unit with the largest SQE will be selected for further processing and the remaining protocol data units will be dropped. The RSSI measurement set that came with the selected protocol data unit PDU is forwarded to the appropriate base radio session BRS for handover message generation.

Figure 15:
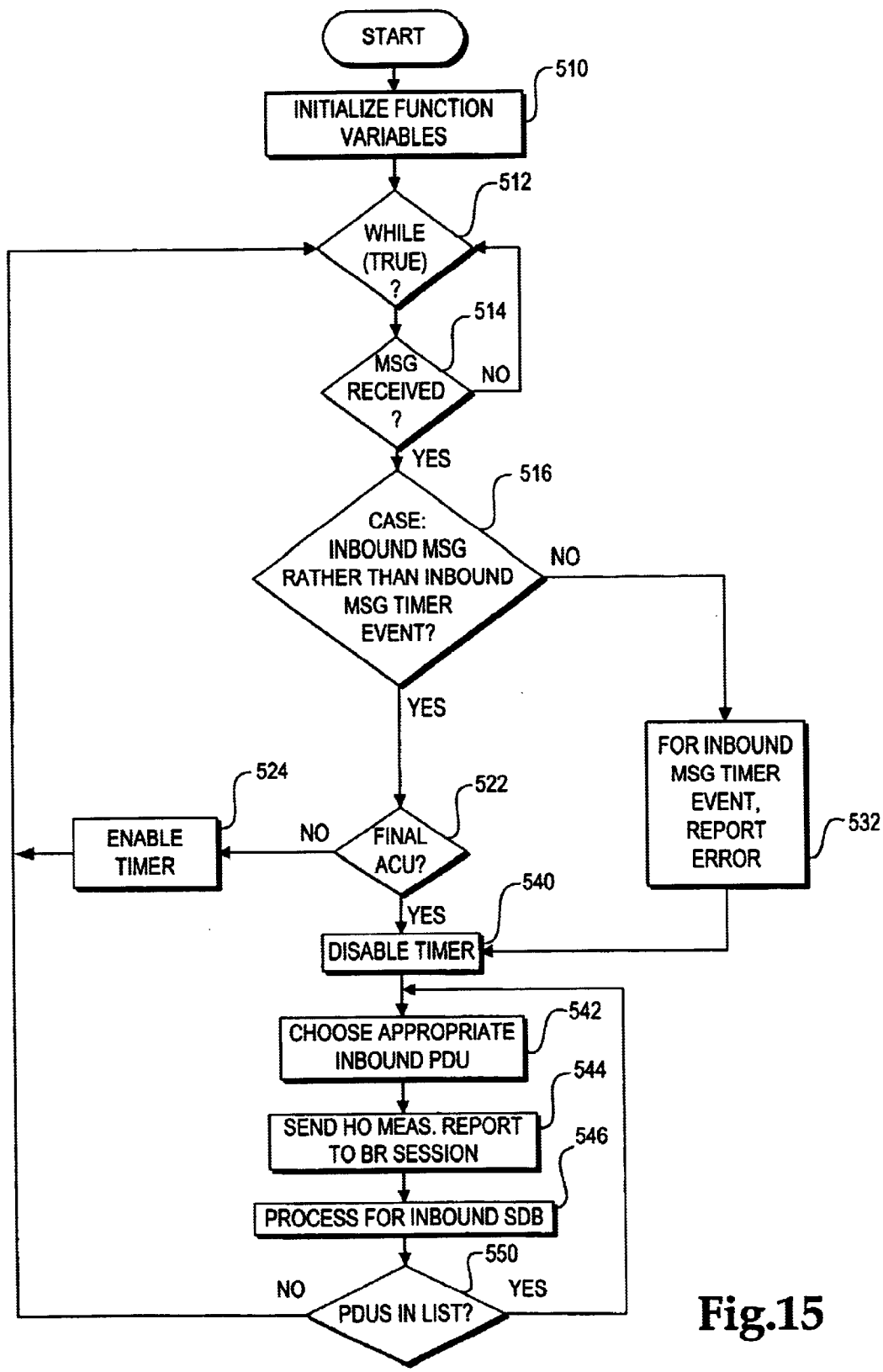
FIG. 15 is a flow diagram of an inbound message processing task.

FIG. 15 is a flow chart of the inbound message task INTASK. In one embodiment, there is only one timer and it is enabled upon the reception of the first airlink chassis unit ACU message. If the timer event happens, then the currently available bundle is used and any following bundles from the same time slot are discarded. The system also reports an Error. The timer in FIG. 15 generally has a higher resolution than what is offered by the system clock.

As illustrated in FIG. 15, at a block 510, the routine initializes the function variables. At decision blocks 512 and 514, the routine enters a loop with a timer that is enabled at a block 524 (as will be described in more detail below), which continues until a message is received. Once it is determined at decision block 514 that a message has been received, then the routine continues to a decision block 516. At decision block 516, the routine determines whether the received message is an inbound message rather than an inbound message timer event. If at decision block 516 the routine determines that the received message is not an inbound message and is thus an inbound timer event, then the routine proceeds to a block 532. At block 532, an error is reported, and the routine then proceeds to a block 540, as will be described in more detail below.

If at decision block 516, the routine determines that the received message is an inbound message, then the routine continues to a decision block 522. At decision block 522, the routine determines whether the final airlink chassis unit ACU has been reached. If the final airlink chassis unit ACU has not been reached, then the routine proceeds to block 524, where the timer is enabled, and the routine returns to decision block 512.

If at decision block 522 the routine determines that the final ACU has been reached, then routine continues to block 540. At block 540, the timer is disabled. At a block 542, the routine choose an appropriate inbound PDU. At a block 544, the routine sends the HO measurement report to the base radio session. At a block 546, the routine processes for inbound SDB. At a decision block 550, the routine determines whether there are additional PDUs in the list. If there are additional PDUs in the list, then the routine returns to block 542. If there are not PDUs remaining in the list, then the routine returns to decision block 512.

The Network and radio blade RB management tasks are responsible for the association of a particular radio blade RB, radio unit RFU, airlink processing card APC, airlink chassis unit ACU, and base radio session BRS. In the simulcast systems of the present invention, there can be multiple radio unit RFUs and airlink chassis units ACU associated with a particular sector. Upon detection of a radio blade, the iRBS task notifies the appropriate network processing card NPC that an additional radio blade RB has been added. This message identifies the airlink processing card APC and radio unit RFU that is associated with the radio blade RB. The radio blade task RBT is responsible for the GPS slot/frame sync to the radio blades RB, as was described above.

In the non-simulcast embodiment, the slot requests come as messages to the message router MR with the slot number. In the simulcast embodiment, the same slot request message is sent to the outbound message task OUTTASK, although one difference is that the source of the message is the ISR that is synchronized to the integrated site controller ISC clock. In one embodiment, the Interface Card IC and LAN interface card LC have a component FPGA that is programmed to generate a 15 mSec signal to the airlink processing card APC/network processing card NPC that is synchronized with the 1 pps integrated site controller ISC signal. This is used as a trigger for inbound and outbound processing.

An inbound message timer is used to trigger the event in which the INTASK is expecting a message from the airlink chassis unit ACU, but never receives it. The problem here is that the inbound message task INTASK needs to know within a reasonable time period (e.g., about 1 mSec) so that it can meet the outbound timing requirements even though, in one embodiment, the system clock is at about a 16 mSec resolution. In one embodiment, the solution is to use an auxiliary clock AUXCLOCK. The auxiliary clock AUX-CLOCK is set up with a resolution of 1000 ticks/sec resulting in a 1 mSec interval. An ISR is attached to this system clock so that it will send a Timeout Message after 1 mSec to the inbound message task INTASK. The auxiliary clock AUXCLOCK is enabled only after the first inbound message is received and disabled after the second message or a timeout. This prevents the auxiliary clock AUXCLOCK ISR from going off during periods that it is not needed and wasting valuable CPU cycles. This effectively configures the auxiliary clock AUXCLOCK as a one-shot timer.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A disturbed radio system, comprising:
   a plurality of processing elements and radio frequency transmitter elements, the processing elements and the radio frequency transmitter elements being interconnected by an Ethernet network;
   wherein the distributed radio system simulcasts data in the form of a common modulating signal on a common radio frequency carrier using at least two radio frequency transmitter elements which are designated as a radio frequency simulcast set;
   wherein the elements of the radio frequency simulcast set are configured to receive Ethernet sampled signal rackets and to transmit the information contained in the packets by modulating the radio frequency carrier; and
   wherein the simulcast method comprises:
      transmitting a first set of Ethernet packets to be received by the elements of the radio frequency simulcast set, the first set of Ethernet packets used to program the elements of the radio frequency simulcast set with a multicast address, the elements of the radio frequency simulcast set thereafter responsive to Ethernet packets containing the multicast address as the designation media access control (MAC) address.

2. The distributed radio system of claim 1, wherein the simulcast method further comprises:

transmitting a second set of Ethernet packets to be received by the elements of the radio frequency simulcast set, the second set of Ethernet packets being used to program the elements of the radio frequency simulcast set to operate using a particular radio frequency carrier.

3. The distributed radio system of claim 2, wherein the simulcast method further comprises:

periodically transmitting Ethernet sampled signal packets, the Ethernet sampled signal packets having a destination address which is equivalent to the programmed multicast address, the elements of the radio frequency simulcast set configured to receive the Ethernet sampled signal packets, the elements of the radio frequency simulcast set modulating the common radio frequency carrier in accordance with the sampled data included in the Ethernet sampled signal packets.

4. The distributed radio system of claim 1, wherein the is primarily located indoors.

5. The distributed radio system of claim 4, wherein the system is operated at low power levels such that the system will not substantially interfere with an existing macrocellular environment, even when the system is operating in the same frequency band for a given cellular standard.

6. The distributed radio system of claim 1, wherein the processing elements comprise at least one central processing unit and a plurality of airlink processing units, the central processing unit being responsible for interfacing the system to external environments, and each airlink processing unit being coupled to one or more of the radio frequency transmitter elements through the Ethernet network.

7. The distributed radio system of claim 6, further comprising a layer 2 that is centralized at the central processing unit.

8. A distributed radio system, comprising:

a plurality of processing elements and radio frequency transmitter elements, the processing elements and the radio frequency transmitter elements being interconnected by an Ethernet network;

wherein the distributed radio system simulcasts data in the form of a common modulating signal on a common radio frequency carrier using at least two radio frequency transmitter elements which are designated as a radio frequency simulcast set;

wherein the processing elements comprise at least one central processing unit and a plurality of airlink processing units, the central processing unit being responsible for interfacing the system to external environments, and each airlink processing unit being coupled to one or more of the radio frequency transmitter elements through the Ethernet network;

wherein a layer 2 is centralized at the central processing unit; and wherein layer 2 data and layer 2 Ethernet packets are sent by the central processing unit to the plurality of airlink processing units that are associated with the radio frequency simulcast set, the plurality of airlink processing units further processing layer 2 data into waveforms, the waveforms being transmitted by the radio frequency simulcast set.

9. A distributed radio system, comprising:

a plurality of processing elements and radio frequency transmitter elements, the processing elements and the radio frequency transmitter elements being interconnected by an Ethernet network;

wherein the distributed radio system simulcasts data in the form of a common modulating signal on a common radio frequency carrier using at least two radio frequency transmitter elements which are designated as a radio frequency simulcast set;

wherein the processing elements comprise at least one central processing unit and a plurality of airlink processing units, the central processing unit being responsible for interfacing the system to external environments, and each airlink processing unit being coupled to one or more of the radio frequency transmitter elements through the Ethernet network; and wherein transmissions of the waveforms are implemented by a two-level multicast technique, in which layer 2 transmit data is sent by the central processing unit in layer 2 format as multicast Ethernet packets to the plurality of airlink processing units associated with the radio frequency simulcast set, after which the transmit data is sent from each airlink processing unit to the radio frequency simulcast set in layer 1 format as multicast Ethernet packets.

10. A distributed radio system, comprising:

a plurality of processing elements and radio frequency transmitter elements, the processing elements and the radio frequency transmitter elements being interconnected by an Ethernet network;

wherein the distributed radio system simulcasts data in the form of a common modulating signal on a common radio frequency carrier using at least two radio frequency transmitter elements which are designated as a radio frequency simulcast set; and wherein at least a portion of the data that is to be transmitted by the radio frequency simulcast set is bundled, such that at least some of the data for multiple radio frequency channels is grouped into a single Ethernet packet.

11. The distributed radio system of claim 10, wherein the system further comprises Ethernet switches which are configured to filter the transmission of designated data so as to limit the amount of data that is transmitted.

12. The distributed radio system of claim 10, wherein the elements of the radio frequency simulcast set are configured to receive Ethernet sampled signal packets and to transmit the information contained in the packets by modulating the radio frequency carrier.

13. The distributed radio system of claim 10, wherein the system is primarily located indoors.

14. The distributed radio system of claim 13, wherein the system is operated at low power levels such that the system will not substantially interfere with an existing macrocellular environment, even when the system is operating in the same frequency band for a given cellular standard.

15. A distributed radio system, comprising:

a plurality of processing elements and a plurality of radio frequency receiver elements, the processing elements and the radio frequency receiver elements being interconnected by an Ethernet network;

wherein the radio frequency receiver elements are configured to receive signals from a mobile unit;

wherein the signals transmitted from the mobile unit are detected by multiple radio frequency receiver units, and the system selects one of the radio frequency receiver elements for processing;

wherein the selection process is a distributed process in that the selection process occurs at two or more of the processing elements of the system;

wherein the plurality of processing elements comprise at least one central processing unit and a plurality of airlink processing units, the central processing unit being responsible for interfacing the system to external environments, and each airlink processing unit being coupled to one or more of the radio frequency receiver elements;

wherein the selection process occurs in part at the central processing unit and in part at the airlink processing unit; and wherein each airlink processing unit selects a received signal from only one of the radio frequency receiver elements and thus forwards only one signal to the central processing unit where a final signal selection is made.

16. The distributed radio system of claim 15, wherein distribution of the selection process is dependant on the available data rate of the system, in that more signals will be forwarded to the central processing unit when a higher data rate is available than when a lower data rate is available.

17. The distributed radio system of claim 15, wherein the distributed processing utilized by the selection process is synchronized in that the central processing unit is synchronized with the radio frequency receiver elements.

18. The distributed radio system of claim 17, wherein the airlink processing units are also synchronized.

19. A distributed radio system, comprising:

a plurality of processing elements and a plurality of radio frequency receiver elements, the processing elements and the radio frequency receiver elements being interconnected by an Ethernet network;

wherein the radio frequency receiver elements are configured to receive signals from a mobile unit;

wherein the signals transmitted from the mobile unit are detected by multiple radio frequency receiver units, and the system selects one of the radio frequency receiver elements for processing;

wherein the selection process is a distributed process in that the selection process occurs at two or more of the processing elements of the system;

wherein the plurality of processing elements comprise at least one central processing unit and a plurality of airlink processing units, the central processing unit being responsible for interfacing the system to external environments, and each airlink processing unit being coupled to one or more of the radio frequency receiver elements; and wherein a selection time window is utilized at the central processing unit for establishing a time limit for completing the selection process.

20. The distributed radio system of claim 19, wherein the central processing unit includes a time base that is synchronized with the airlink processing units and the radio frequency receiver elements.

21. The distributed radio system of claim 19, wherein the distributed processing utilized by the selection process is synchronized in that the central processing unit is synchronized with the radio frequency receiver elements.

22. The distributed radio system of claim 21, wherein the airlink processing units are also synchronized.

23. A distributed radio system, comprising:

a plurality of processing elements and a plurality of radio frequency receiver elements, the processing elements and the radio frequency receiver elements being interconnected by an Ethernet network;

wherein the radio frequency receiver elements are configured to receive signals from a mobile unit;

wherein the signals transmitted from the mobile unit are detected by multiple radio frequency receiver units, and the system selects one of the radio frequency receiver elements for processing;

wherein the selection process is a distributed process in that the selection process occurs at two or more of the processing elements of the system;

wherein the plurality of processing elements comprise at least one central processing unit and a plurality of airlink processing units, the central processing unit being responsible for interfacing the system to external environments, and each airlink processing unit being coupled to one or more of the radio frequency receiver elements; and wherein data is sent from the airlink processing units to the central processing unit and at least a portion of the data that is sent from at least one of the airlink processing units to the central processing unit is bundled into one or more Ethernet packets, rather than sending individual Ethernet packets for each radio frequency channel.

24. The distributed radio system of claim 23, wherein the system further comprises Ethernet switches, the Ethernet switches being selectively managed so as to reduce the amount of data that is transmitted between the processing elements.

25. The distributed radio system of claim 23, wherein the distributed processing utilized by the selection process is synchronized in that the central processing unit is synchronized with the radio frequency receiver elements.

26. The distributed radio system of claim 25, wherein the airlink processing units are also synchronized.

* * * * *

UNITED STATES PATENT AND TRADEMARK OFFICE
CERTIFICATE OF CORRECTION

PATENT NO. : 6,778,518 B2
DATED : August 17, 2004
INVENTOR(S) : M. Jesse et al.

It is certified that error appears in the above-identified patent and that said Letters Patent is hereby corrected as shown below:

Column 26,
Lines 62-63, "rack- should read -- pack-
              ets"                    ets --

Column 27,
Line 27, "the is" should read -- the system is --

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,778,518 B2
DATED : August 17, 2004
INVENTOR(S) : M. Jesse et al.

It is certified that error appears in the above-identified patent and that said Letters Patent is hereby corrected as shown below:

<u>Column 26,</u>
Line 51, "disturbed" should read -- distributed --

Signed and Sealed this

Fifth Day of April, 2005

JON W. DUDAS
*Director of the United States Patent and Trademark Office*